US011578779B2

(12) United States Patent
Cantenot et al.

(10) Patent No.: US 11,578,779 B2
(45) Date of Patent: Feb. 14, 2023

(54) INTERMEDIATE PLATE APPARATUS AND RELATED DAMPER ASSEMBLIES FOR USE WITH VEHICLES

(71) Applicant: VALEO KAPEC CO., LTD., Daegu (KR)

(72) Inventors: Antoine Cantenot, Auburn Hills, MI (US); Sungchul Lee, Auburn Hills, MI (US)

(73) Assignee: VALEO KAPEC CO., LTD., Daegu (KR)

( * ) Notice: Subject to any disclaimer, the term of this patent is extended or adjusted under 35 U.S.C. 154(b) by 192 days.

(21) Appl. No.: 16/842,098

(22) Filed: Apr. 7, 2020

(65) Prior Publication Data
US 2021/0310539 A1    Oct. 7, 2021

(51) Int. Cl.
| F16F 15/121 | (2006.01) |
| F16H 45/02 | (2006.01) |
| F16F 15/12 | (2006.01) |
| F16F 15/14 | (2006.01) |

(52) U.S. Cl.
CPC ...... *F16F 15/1213* (2013.01); *F16F 15/1203* (2013.01); *F16F 15/1421* (2013.01); *F16H 2045/0221* (2013.01)

(58) Field of Classification Search
CPC ............... F16F 15/1213; F16F 15/123; F16H 2045/0221
See application file for complete search history.

(56) References Cited

U.S. PATENT DOCUMENTS

| 8,771,088 B2 | 7/2014 | Takikawa et al. |
| 2012/0247901 A1 | 10/2012 | Kawahara |
| 2013/0048459 A1 | 2/2013 | Matsuoka |
| 2016/0290462 A1 | 10/2016 | Fujiwara et al. |

(Continued)

FOREIGN PATENT DOCUMENTS

| JP | 2002-48217 A | 2/2002 | |
| JP | 2002048217 A | * 2/2002 | ............. F16H 45/02 |

(Continued)

OTHER PUBLICATIONS

International Search Report dated Jul. 19, 2021 in PCT/KR2021/004078, 3 pages.

*Primary Examiner* — Richard M Lorence
*Assistant Examiner* — Aimee Tran Nguyen
(74) *Attorney, Agent, or Firm* — Oblon, McClelland, Maier & Neustadt, L.L.P.

(57) ABSTRACT

Intermediate plate apparatus and related damper assemblies for use with vehicles are disclosed. A disclosed vehicle torque converter includes a clutch and a torsional vibration damper configured to receive a torque from the clutch when the clutch is engaged and dampen a torsional vibration in the torque. The torsional vibration damper includes a driven plate, a retainer plate, a first spring member, a second spring member, and an intermediate plate positioned radially outward relative to the driven plate and the retainer plate. The intermediate plate includes a body that defines an annular cavity though which the first and second spring members extend. The body is configured to engage inner and outer radial portions of the respective first and second spring members to maintain bend radii of the respective first and second spring members.

16 Claims, 17 Drawing Sheets

(56) References Cited

U.S. PATENT DOCUMENTS

| | | | |
|---|---|---|---|
| 2017/0108050 A1* | 4/2017 | Lee | F16F 15/1234 |
| 2017/0108075 A1* | 4/2017 | Yang | F16F 15/12313 |
| 2017/0276221 A1* | 9/2017 | Kuwahata | F16F 15/12346 |
| 2019/0120360 A1 | 4/2019 | Sung et al. | |
| 2020/0072333 A1* | 3/2020 | Matsuda | F16F 15/1338 |

FOREIGN PATENT DOCUMENTS

| | | |
|---|---|---|
| JP | 5009646 B2 | 8/2012 |
| JP | 2016-125511 A | 7/2016 |
| KR | 10-2019-0142087 A | 12/2019 |

\* cited by examiner

INTERMEDIATE PLATE APPARATUS AND RELATED DAMPER ASSEMBLIES FOR USE WITH VEHICLES

FIELD OF THE DISCLOSURE

This disclosure relates generally to vehicles and, more particularly, intermediate plate apparatus and related damper assemblies for use with vehicles.

BACKGROUND

Some motor vehicles having automatic transmission functionality employ fluid couplings, such as torque converters, that are interposed between an engine and a vehicle transmission to facilitate transferring torque from the engine to the vehicle transmission. These torque converters may include a lockup clutch and a torsional vibration damper (e.g., a tuned spring and mass) that is operatively coupled to the lockup clutch and configured to reduce torsional vibrations or sudden rotational movements generated by the engine when the lockup clutch is engaged. Such torsional vibration dampers increase part life for components of the vehicle transmission and/or other components of a vehicle driveline while the vehicle torque converter is in a locked state.

SUMMARY

An example vehicle torque converter includes a clutch and a torsional vibration damper configured to receive a torque from the clutch when the clutch is engaged and dampen a torsional vibration in the torque. The torsional vibration damper includes a driven plate and a retainer plate rotatable relative to the driven plate. The torsional vibration damper also includes a first spring member operatively coupled to the driven plate and the retainer plate and a second spring member operative coupled to the driven plate and the retainer plate. Rotation of the retainer plate relative to the driven plate compresses and decompresses the first and second spring members. The torsional vibration damper also includes an intermediate plate positioned radially outward relative to the driven plate and the retainer plate, the intermediate plate including a body that defines an annular cavity though which the first and second spring members extend. The body is configured to engage inner and outer radial portions of the respective first and second spring members to maintain bend radii of the respective first and second spring members.

An example damper assembly of a vehicle torque converter includes a first spring member and a second spring member. The damper assembly also includes an output portion coupled to a turbine and having an output tab configured to engage the first and second spring members. The damper assembly also includes an input portion coupled to a piston of a clutch and having an input tab configured to engage the first and second spring members. The input portion is rotatable relative to the output portion. The damper assembly also includes an intermediate portion rotatable relative to the output and input portions. A body of the intermediate portion including an inner radial portion, a central portion, and an outer radial portion that, together, form a spring cavity in which the first and second spring members are positioned. The inner and outer radial portions of the body are configured to radially guide the first and second spring members.

An example method of assembling a damper of a vehicle torque converter includes aligning a spring member of the damper with an intermediate plate of the damper that is positioned radially outward relative to a retainer plate of the damper and a driven plate of the damper. The intermediate plate includes a cavity configured to receive the spring member. The method also includes bending the spring member. The method also includes guiding, via the intermediate plate, inner and outer radial portions of the spring member whereby opposite ends of the spring member engage an inner circumferential surface of the intermediate plate and a central area of the spring member engages an outer circumferential surface of the intermediate plate.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Figure 1:
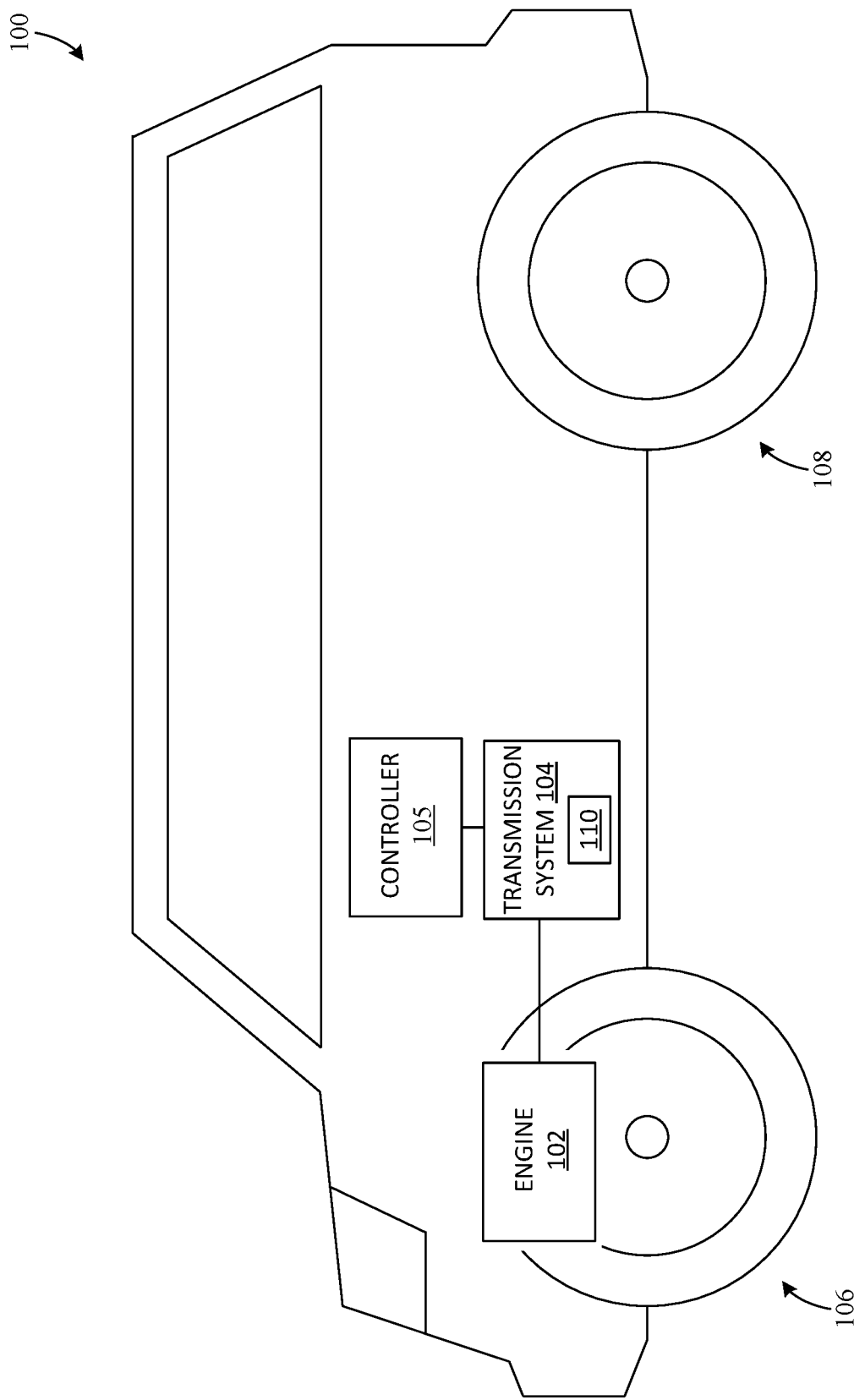
FIG. 1 is a schematic illustration of an example vehicle in which examples disclosed herein can be implemented.

Some known vehicle torque converters include a known spring damper, such as a long travel damper (LTD), that is operatively coupled to a lockup clutch in a torque converter housing. The known spring damper is configured to dampen harsh torsional vibrations generated by a vehicle engine when the lockup clutch is engaged. When straight springs are used in a known LTD, a known intermediate plate typically guides the outer diameters of the respective straight springs as the springs are bent and elastically curved during assembly of the known LTD. Further, a known damper retainer plate typically guides the inner diameters of the respective straight springs as the springs are being bent and elastically curved during the assembly. As a result, during the assembly, extremities of the springs are urged into contact with the known intermediate plate, and the centers of the springs are urged into contact with the known retainer plate. However, such known spring dampers increase difficulty in assembling (e.g., manually assembling) the springs due to an associated design complexity resulting from using separate components to radially guide the springs. As a result, these known spring dampers substantially increase production time and/or costs associated with the manufacturing vehicle torque converters or dampers thereof. Additionally, such known intermediate plates are prone to substantial radial deformation due to a centrifugal load generated by the springs during damper operation.

Intermediate plate apparatus and related damper assemblies for use with vehicles are disclosed. Disclosed examples provide an example damper assembly (e.g., forming a damper such as a spring damper) that is operatively coupled to a clutch of a vehicle torque converter and configured to receive a first torque (e.g., a substantially unregulated torque such as raw engine torque) from the clutch, for example, when the clutch is engaged or transitioning from a disengaged state to an engaged state. In particular, when one or more torsional vibrations exist or are present in the first torque (e.g., resulting from engine operation), the disclosed damper assembly is configured to dampen the torsional vibration(s) in the first torque, thereby providing a second torque (e.g., a substantially regulated torque) to a vehicle transmission system operatively coupled to the vehicle torque converter. In some examples, the disclosed damper assembly includes an output portion (e.g., a driven plate), an input portion (e.g., retainer plate) rotatable relative to the output portion, and at least a pair of spring members (i.e., a first spring member and a second spring member) operatively coupled to the input and output portions. The spring members of the disclosed damper assembly can be implemented, for example, using one or more compression springs that are substantially straight or unbent prior to installation on the damper assembly. Each of the input portion and the output portion is engaged with and/or configured to engage a seat (e.g., spring seats) positioned adjacent an end of a respective one of the first and second spring members. Rotation of the input portion relative to the output portion compresses, decompresses, and/or otherwise changes states of the respective spring members of the damper assembly, which generates a damping effect associated with reducing and/or eliminating the torsional vibration(s) in the first torque. In some examples, the disclosed input portion is relatively non-rotatably (i.e., fixedly) coupled to a piston of the clutch to receive the first torque from the piston. Further, the disclosed output portion is relatively non-rotatably (i.e., fixedly) coupled to a turbine or hub (e.g., a turbine hub), which is connected to the vehicle transmission system, to provide the second torque to the turbine or hub. Accordingly, in such examples, torque is transmittable through the damper assembly from the clutch to the turbine or hub when the vehicle torque converter is in a locked operating mode.

Disclosed examples also provide an example intermediate portion (e.g., an intermediate plate) that is positioned in the vehicle torque converter adjacent the piston and radially outward relative to the input and output portions, which facilitates damper operation. For example, an outer radius of the intermediate portion is proximate to outer radii of respective ones of the input portion, the output portion, and the piston. The disclosed intermediate portion includes a first example body (e.g., an annular body such as a plate) defining at least a first cavity (e.g., an annular cavity such as a spring cavity) of the intermediate portion through which the first and second spring members extend and/or are positioned, which is sometimes referred to as a spring cavity. That is, the first disclosed body of the intermediate portion is sized and/or shaped such that the spring members of the damper assembly are positionable in the first cavity. In other words, the first cavity is configured to receive the spring members of the damper assembly. In some examples, the first body or at least a portion (e.g., a tab) thereof is engaged with the spring members and configured to transfer a biasing force between the spring members as the input and output portions rotate relative the intermediate portion. That is, the disclosed intermediate portion is rotatable relative to the input portion and/or the output portion. In particular, the disclosed intermediate portion is advantageously used as both inner and outer radius spring guides for the spring members of the damper assembly, as discussed in greater detail below in connection with FIGS. 3-18. Additionally, the disclosed intermediate portion is sized, shaped, structured, and/or otherwise configured to substantially improve a radial stiffness of the intermediate portion. In some examples, the first body of the intermediate portion includes a first cross-sectional area that is U-shaped and/or C-shaped and substantially uniform at least partially across a primary sector of the intermediate portion, which better enables the intermediate portion to receive and carry the spring members via the first cavity. In such examples, the first cross-sectional area provides at least a portion of or the entire first cavity of the intermediate portion. Such a design of the disclosed intermediate portion also substantially increases the radial stiffness of the intermediate portion compared to the above-mentioned known intermediate plates and, thus, reduces and/or minimizes radial deformation of the intermediate portion under loading. For example, during operation of the vehicle torque converter when the clutch is engaged, a value corresponding to a maximum radial deformation of the intermediate portion is substantially 0.75 millimetres (mm) or less. Further, the disclosed intermediate portion ensures an easy manual assembly of the damper assembly, for example, when bending the spring members and/or fitting the spring members inside the intermediate plate.

In some examples, each of the disclosed input and output portions of the damper assembly includes a tab engaged with and/or interposed between ends of the respective first and second spring members that face each other. In such examples, the output portion includes a second body (e.g., an annular body such as a plate) and at least a first output tab positioned on the second body. Further, the input portion includes a third body (e.g., an annular body such as a plate) and at least a first input tab positioned on the second body. In particular, the first input tab and the first output tab are moveable relative to (e.g., toward and/or away from) each other to change the state(s) of the respective spring member(s), thereby providing the damping effect. Additionally, in some examples, the disclosed intermediate portion includes at least two example transfer tabs (i.e., a first transfer tab and a second transfer tab), each of which is engaged with an opposite end of the respective spring members. For example, each of the first and second spring members has (a) a first end that is engaged with the first input tab of the input portion and the first output tab of the output portion and (b) a second end, opposite the first end, that is engaged with one of the first or second transfer tabs of the intermediate portion. Additionally or alternatively, in such examples, each of the first input tab and/or the first output tab is movable relative to transfer tabs of the intermediate portion In some examples, the disclosed intermediate portion is slidably interposed between the piston and the input portion, which facilitates maintaining a relative position and/or orientation of the intermediate portion. In such examples, the disclosed intermediate portion is axially guided by the piston and the first input tab of the input portion. For example, during damper operation, the piston and the first input tab are configured to directly contact and/or slide against the first body. Further, in such examples, the intermediate portion is radially guided by at least part of the input portion. For example, during damper operation, an example lip of the input portion is configured to directly contact and/or slide against the intermediate portion. In such examples, the lip includes an outer surface (e.g., an outer circumferential surface) that is positioned adjacent to and radially inward relative to an inner surface (e.g., an inner circumferential surface) of the first body of the intermediate portion.

In some examples, the first body of the intermediate portion includes a first portion (e.g., an inner radial portion and/or a circumferential wall), a second portion (e.g., a central portion and/or an annular wall), and a third portion (e.g., an outer radial portion and/or a circumferential wall) that, together, form and/or define one or more cross-sectional areas of the body such as, for example, the first cross-sectional area. As such, at least some or all of the portions of the first body provide the first cavity of the intermediate portion. In such examples, the first and third portions are substantially concentric and spaced from each other by a radial distance. As such, the first portion of the first body is positioned radially inward relative to the third portion of the first body whereby the first and second spring members are at least partially positioned between the first and third portions of the first body. The second portion of the first body extends from the first portion of the first body to the third portion of the first body alongside the spring members and connects the first and third portions together. In particular, in such examples, the first portion of the first body and the third portion of the first body are configured to radially guide the first and second spring members. In some examples, the first portion of the first body is configured provide inner radial guidance to the first and second spring members, and the third portion of the first body is configured to provide outer radial guidance to the first and second spring members. For example, when installed on the damper assembly, each of the first and second spring members of the damper assembly includes an inner radial portion corresponding to an inner radius of the damper assembly and an outer radial portion corresponding to an outer radius of the damper assembly larger than the inner radius. In such examples, the first portion of the first body directly contacts and/or slides against the inner radial portions of the respective first and second spring members such as, for example, on centers or central areas of the respective first and second spring members. Further, in such examples, the third portion of the first body directly contacts and/or slides against the outer radial portions of the respective first and second spring members such as, for example, on extremities (e.g., opposite ends) of the respective first and second spring members. As a result of such engagement of the first body with the first and second spring members, the first body of the intermediate portion effectively maintains bend radii of the respective first and second spring members. Stated differently, in some examples, the first body of the intermediate portion is configured to engage (e.g., slidably engaged) the inner and outer radial portions of the respective first and second spring members to maintain the bend radii. According to one or more disclosed examples, such spring member guiding occurs (a) when installing the spring members on the disclosed damper assembly (e.g., while the first and second spring members are being bent and/or elastically curved) and/or (b) during operation of the disclosed damper assembly.

In some examples, such inner radial guiding of the spring members does not occur over the entire circumference of the intermediate portion. In particular, some disclosed examples provide at least a first example cutout that is positioned and/or formed on the first portion of the first body, which at least partially exposes the first cavity as well as the inner radial portions of the respective first and second spring members. For example, a second cross-sectional area of the first body, different relative to the first cross-sectional area, is substantially L-shaped and uniform at least partially across a secondary sector of the intermediate portion adjacent the primary sector, which provides provide the first cutout. Unlike the first cross-sectional area, only the second and third portions of the first body form and/or define the second cross-sectional area. That is, the first portion of the third body does not form and/or define any portion of the second cross-sectional area. In such examples, the first cutout facilitates contact between (a) the first output tab and the first input tab and (b) a pair of seats engaged with the ends of the respective first and second spring members that face each other. In particular, the first cutout ensures a sufficient angular displacement freedom associated with the input and output portions of the damper assembly. Additionally, such a cutout is efficient in minimizing the axial space used by the disclosed damper assembly by allowing the intermediate portion, the input portion, and the output portion to be positioned substantially close together without interfering with each other.

Additionally, in some examples, as the input portion and/or the output portion rotate(s) relative the intermediate portion, the first input tab and the first output tab travel across at least a partial length of the first cutout relative to (e.g., toward and/or away from) the first and second transfer tabs. In such examples, the first cutout is sized and/or shaped such that the input portion and/or the output portion is/are rotatable relative to the intermediate portion by half of a maximum angular travel of the damper assembly, for example, both in a positive and negative angle direction. In such examples, a size of the first cutout is limited to ensure sufficient radial guiding of the first and second spring members occurs such that more than half of an uncompressed length of the first or second spring member is radially guided by the first portion of the first body. However, in some examples, the intermediate portion is implemented without the first cutout or any other such cutout. In such examples, the first body of the intermediate portion only includes the first cross-sectional area but not the second cross-sectional area. In particular, in such examples, the first output tab of the output portion engages the first and second spring members from an open side of the first cross-sectional area, and the first input tab of the input portion engages the first and second spring members from the open side of the first cross-sectional area. That is, in such examples, the each of the first output tab and the first input tab extends at least partially into the open side of the first cross-sectional area.

In some examples, to install the spring members on the damper assembly, each of the spring members is first bent and/or elastically curved, which allows the spring members to fit within the first cavity of the intermediate portion. For example, during manipulation of the first spring member, the first spring member forms a bend radius of the first spring member. In particular, when the first spring member is suitably positioned and/or oriented within the first cavity, the first body of the intermediate portion engages the inner and outer radial portions of the first spring member to maintain the bend radius of the first spring member. Similarly, during manipulation of the second spring member, the second spring member forms a bend radius of the second spring member. In particular, when the second spring member is suitably positioned and/or oriented in the first cavity, the first body of the intermediate portion engages the inner and outer radial portions of the second spring member to maintain the bend radius of the second spring member. As such, some disclosed examples guide the inner and outer radial portions of the respective spring members and/or maintain the bend radii of the respective spring members via the disclosed intermediate portion during installation of the spring members. In this manner of using a single component (i.e., the disclosed intermediate portion) to provide radial guidance to the spring members of the damper assembly, disclosed examples reduce production time and/or costs compared to the above-mentioned known dampers.

FIG. 1 is a schematic illustration of a vehicle (e.g., a car, a truck, a sport utility vehicle (SUV), etc.) 100 in which examples disclosed herein can be implemented. According to the illustrated example of FIG. 1, the vehicle 100 includes an engine (e.g., an internal combustion engine) 102, a transmission system 104, a controller 105, and one or more wheels 106, 108 (sometimes referred to as road wheels), two of which are shown in this example, (i.e., a first or front wheel 106 and a second or rear wheel 108).

The transmission system 104 of FIG. 1 can be implemented, for example, using one of a two-pass automatic transmission, a three-pass automatic transmission, etc. In particular, the transmission system 104 of FIG. 1 is structured and/or configured to transfer torque from the engine 102 to one or more (e.g., all) of the wheel(s) 106, 108, for example, to move the vehicle 100. For example, the engine 102 generates an engine torque and, in response, the transmission system 104 controls an amount or degree of the engine torque that is provided to the wheel(s) 106, 108. In some examples, the transmission system 104 includes a hydraulic system 110 operable by the controller 105, which facilities control of a torque converter clutch (e.g., the clutch 302 discussed below) while the vehicle 100 is driving. The hydraulic system 110 can be implemented, for example, using a pump and one or more valves (e.g., one or more solenoid valves). In particular, the hydraulic system 110 of FIG. 1 is configured to convey a fluid (e.g., a pressurized hydraulic fluid) through a torque converter housing to change a state of the torque converter clutch, which is discussed in greater detail below.

The controller 105 of FIG. 1 can be implemented, for example, using an electronic control unit (ECU) such as a transmission control module (TCM). The vehicle controller 105 is communicatively coupled to the valve(s) of the hydraulic system 110, for example, via a transmission or signal wire, a bus (e.g., a controller area network (CAN)), radio frequency, etc. In particular, the controller 105 is configured to direct the hydraulic system 110 to change the state of the torque converter clutch based on a detected condition of the vehicle 100. For example, the vehicle controller 105 causes at least one of the valve(s) to open and/or close when the vehicle 100 is traveling at a relatively high speed. Further, to facilitate detecting such a condition of the vehicle, the controller 105 may be communicatively coupled to one or more sensors of the vehicle 100 to receive sensor data from the sensor(s).

Figure 2:
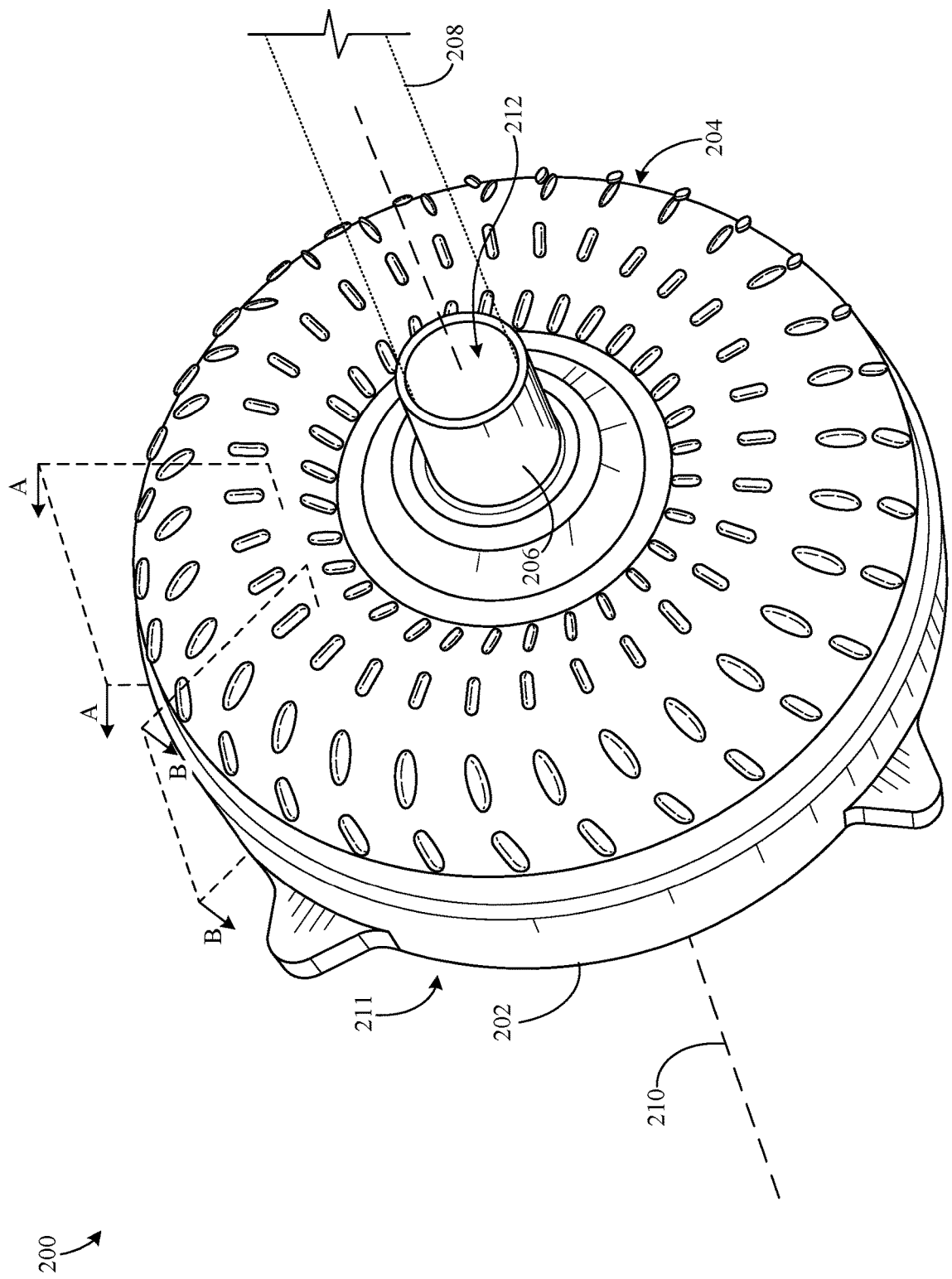
FIG. 2 is a view of an example torque converter in which examples disclosed herein can be implemented.

FIG. 2 is a view of an example torque converter 200 in which examples disclosed herein can be implemented. In some examples, the torque converter 200 of FIG. 2 is implemented in the vehicle 100 of FIG. 1 to facilitate transferring torque between the engine 102 and the transmission system 104. That is, in such examples, the vehicle 100 of FIG. 1 includes the torque converter 200. In particular, the torque converter 200 of FIG. 2 is configured to operatively couple between the engine 102 and the transmission system 104 of the vehicle 100 such that the engine torque is transmittable through the torque converter 200 from the engine 102 to the transmission system 104. According to the illustrated example of FIG. 2, the torque converter 200 includes a cover 202, an impeller 204, and a first hub (e.g. a drive hub) 206.

The torque converter 200 of FIG. 2 is changeable between a first operating mode (e.g., an unlocked or hydraulic operating mode) that is associated with a first operating characteristic of the torque converter 200 and a second operating mode (e.g., a lockup or locked operating mode) that is associated with a second operating characteristic of the torque converter 200 different relative to the first operating characteristic. When the torque converter 200 is in the first operating mode thereof, the torque converter 200 allows for substantial rotational or angular deviation between an output (e.g., a crankshaft) of the engine 102 and a first shaft (e.g., a transmission input shaft) 208 of the transmission system 104, for example, such that a rotational speed of the first shaft 208 is different relative to a rotational speed of the output of the engine 102. As a result, the engine 102 can remain in operation (e.g., the crankshaft of the engine 102 remains rotating) when the vehicle 100 is stopped (e.g., the first shaft 208 is not rotating) without causing the engine 102 to stall or adversely affecting the engine 102 in another manner. Further, in such examples, the torque converter 200 is configured to increase or multiply the engine torque provided to the transmission system 104 and/or the wheel(s) 106, 108 when the vehicle 100 drives at certain speeds (e.g., relatively low speeds).

In some examples, the torque converter 200 of FIG. 2 is configured to substantially prevent rotational or angular deviation of the cover 202 relative to the first shaft 208 when the torque converter 200 is in the second operating mode thereof, for example, via the clutch 302 discussed below. In such examples, the clutch 302, when engaged, provides a mechanical connection between the first shaft 208 and the engine 102. As a result, the torque converter 200 reduces or eliminates engine power loss typically associated with fluid drag during certain driving conditions (e.g., when the vehicle 100 is traveling at relatively high speeds). Additionally, when in the second operating mode or transitioning from the first operating mode to the second operating mode, the torque converter 200 is configured to dampen one or more torsional vibrations generated by the engine 102, for example, via the damper assembly 300 discussed below.

The cover 202 of FIG. 2 is relatively non-rotatably (i.e., fixedly) coupled to a component (e.g., the crankshaft or a flywheel) associated with the engine 102 to receive the engine torque or output from the engine 102, for example, via one or more example fasteners and/or one or more example fastening methods or techniques. That is, the component associated with the engine 102 supports one or more (e.g., all) of the cover 202, the impeller 204, and/or, more generally, the torque converter 200 when the cover 202 and the component of the engine 102 are assembled. In some examples, the torque converter 200 includes a flywheel that is interposed between the cover 202 and the crankshaft. Additionally, the cover 202 is relatively non-rotatably (i.e., fixedly) coupled to the impeller 204 to drive the impeller 204 via the engine torque, for example, via one or more example fasteners and/or one or more example fastening methods or techniques (e.g., welding). That is, the cover 202 and the impeller 204, together, are rotatable relative to a first axis (e.g., an axis of rotation) 210 associated with the torque converter 200 in the same rotational direction (e.g., clockwise or counterclockwise). Further, the cover 202 and the impeller 204 form and/or define a housing (e.g., a substantially sealed housing) 211 of the torque converter 200 in which one or more torque converter components are disposed.

The impeller 204 of FIG. 2 is structured and/or configured to control a parameter (e.g., a flow rate, a fluid pressure, etc.) of a fluid in the torque converter housing 211 when the impeller 204 rotates relative to the first axis 210, for example, via one or more fins, one or more blades, one or more vanes, and/or any other suitable fluid flow control member positioned on the impeller 204. Additionally, the impeller 204 is relatively non-rotatably (i.e., fixedly) coupled to the cover 202 to receive the engine torque therefrom, as previously mentioned. In some examples, in response to the impeller 204 rotating relative to the first axis 210 when the torque converter 200 is in the first operating mode thereof, the torque converter 200 generates an output or a torque (sometimes referred to as an output torque) for the transmission system 104, a magnitude of which is based on, for example, any of the engine torque, a speed of the vehicle, torus parameters, parameters of the fluid flow control members, fluid parameters, fluid properties, etc.

The first hub 206 of FIG. 2 is connected to the pump of the hydraulic system 110. In particular, rotation of the first hub 206 relative to the first axis 210 causes the pump to change a parameter (e.g., a flow rate, a fluid pressure, etc.) of at least a portion of the fluid, for example, in one of (a) a component (e.g., a gearbox) of the transmission system 104, (b) a fluid path or channel associated with the first shaft 208, (c) the housing 211, or (d) a combination thereof.

Additionally, in some examples, the first hub 206 of FIG. 2 is configured to removably receive the first shaft 208 associated with the vehicle transmission system 104 via an aperture 212 formed by the first hub 206. As shown in FIG. 2, the first shaft 208 extends at least partially into the housing 211 through the aperture 212.

The first shaft 208 of FIG. 2 is configured to couple between the torque converter 200 and the component of the transmission system 104. In particular, the first shaft 208 is configured to transfer the output torque from the torque converter 200 to the transmission system 104, thereby driving the wheel(s) 106, 108. In some examples, the first shaft 208 is inserted into the first hub 206 to connect the first shaft 208 to an output portion of the torque converter 200 such as, for example, the second hub 554 discussed below. In such examples, the first shaft 208 and the output portion are relatively non-rotatably (i.e., fixedly) coupled together, for example, via a splined connection.

Figure 3:
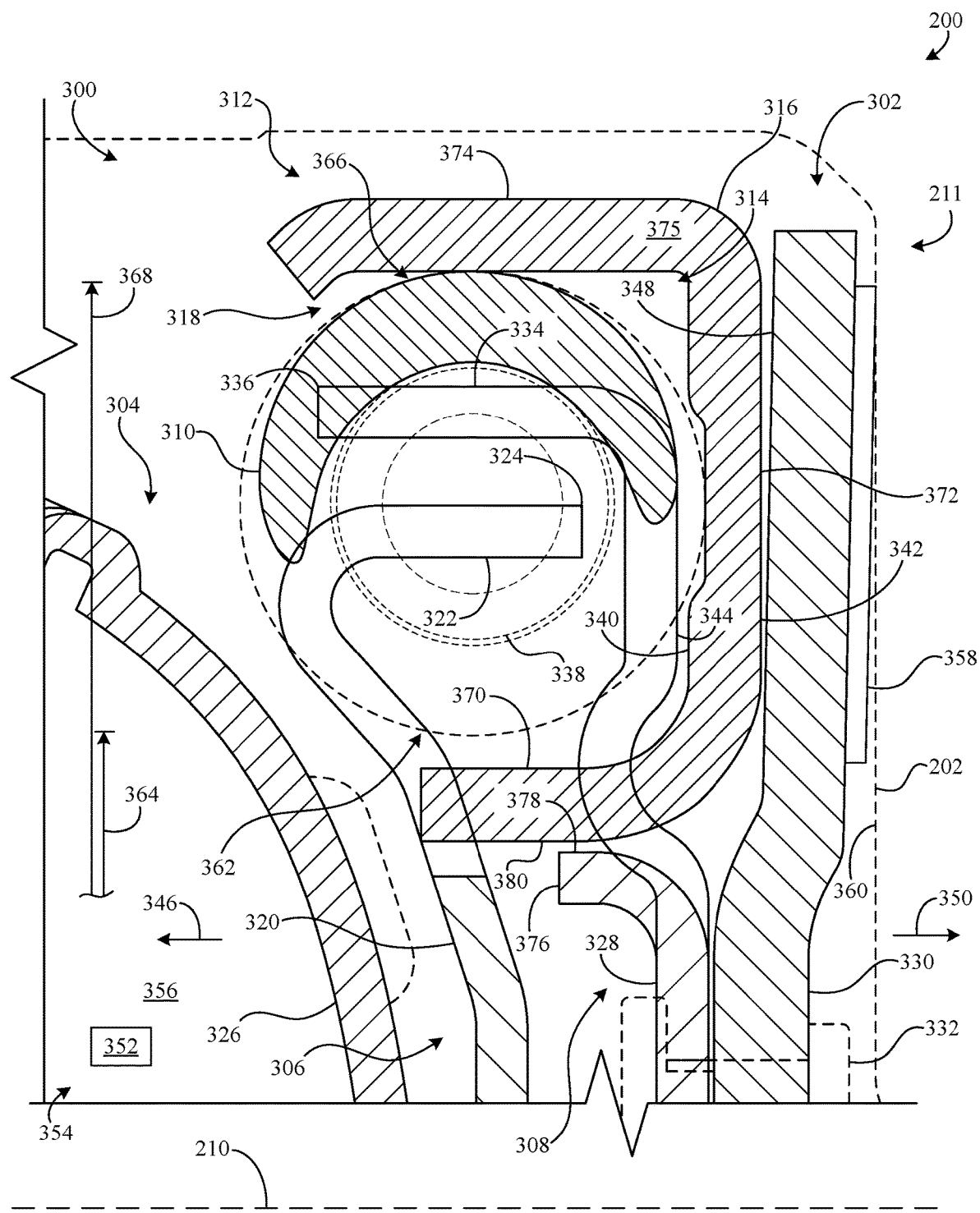
FIG. 3 is a partial cross-sectional view of the example torque converter of FIG. 2 along line A-A and shows an example damper assembly in accordance with the teachings of this disclosure.

FIG. 3 is a partial cross-sectional view of the torque converter 200 of FIG. 2 along line A-A and shows an example damper assembly 300 in accordance with the teachings of this disclosure. The damper assembly 300 of FIG. 3 is positioned in the housing 211 of the torque converter 200. According to the illustrated example of FIG. 3, the damper assembly 300 forms and/or defines a torsional vibration damper of the vehicle torque converter 200 such as, for example, an LTD. In particular, the damper assembly 300 is operatively coupled to a clutch (e.g., a lockup clutch) 302 of the vehicle torque converter 200 and configured to receive a first torque (e.g., a substantially unregulated torque) from the clutch 302, for example, when the clutch 302 is engaged. The first torque may correspond to the engine torque generated by the engine 102. In response to receiving the first torque, the damper assembly 300 of FIG. 3 is configured to dampen one or more torsional vibrations (e.g., generated by the engine 102) in the first torque, thereby providing a second torque (e.g., a substantially regulated torque) to the output portion of the vehicle torque converter 200 different relative to the first torque, as discuss in greater detail below. In some examples, the damper assembly 300 of FIG. 3 is operatively interposed between the clutch 302 and a turbine 304 of the torque converter 200 such that, when the clutch 302 is engaged, torque is transmittable through the damper assembly 300 from the clutch 302 to the turbine 304.

According to the illustrated example of FIG. 3, the damper assembly 300 includes an example output portion (e.g., a driven plate) 306 and an example input portion (e.g., a retainer plate) 308 rotatable relative to the output 306. The output portion 306 of the damper assembly 300 is sometimes referred to as a damper output, and the input portion 308 of the damper assembly 300 is sometimes referred to as a damper input. To facilitate dampening angular movement of the input portion 308 relative to the output portion 308, the damper assembly 300 of FIG. 3 also includes a first example spring member (e.g., a compression spring) 310 operatively coupled to the output portion 306 and the input portion 308. Additionally, the damper assembly 300 of FIG. 3 also includes an intermediate portion (e.g., an intermediate plate) 312 positioned radially outward relative to the output portion 306 and/or the input portion 308. In particular, the intermediate portion 312 of FIG. 3 is configured to provide radial guidance to the first spring member 310 and/or one or more other such spring members, for example, during damper assembly and/or operation of the vehicle torque converter 200, as discussed in greater detail below in connection with FIGS. 4-18. Additionally or alternatively, in some examples, the intermediate portion 312 of FIG. 3 is structured to be particularly rigid and/or stiff in a manner that substantially reduces and/or mitigates radial deformation (e.g., radial deformation) of the intermediate portion 312 when the first spring member 310 imparts a centrifugal load on the intermediate portion 312.

The intermediate portion 312 of FIG. 3 includes a first example cavity (e.g., spring cavity) 314 configured to receive the first spring member 310 and/or one or more other spring members of the damper assembly 300. As shown in FIG. 3, the first spring member 310 is positioned in the first cavity 314. In some examples, the first cavity 314 is substantially annular such that the first cavity 314 extends entirely around the first axis 210 at a single radius associated with the damper assembly 300. On the other hand, in some examples, the first cavity 314 extends only partially around the first axis 210 at the single radius such that the first cavity 314 is substantially arc-shaped and/or otherwise forms an arc. Additionally, the intermediate portion 312 of FIG. 3 includes a first example body (e.g., an annular body) 316 that forms and/or defines the first cavity 314 through which the first spring member 310 of the damper 300 extends. That is, in some examples, the first cavity 314 is positioned on the first body 316 of the intermediate portion 312. Additionally or alternatively, in some examples, the first body 316 of the intermediate portion 312 forms and/or defines a first example opening 318 of the intermediate portion 312 at least partially exposing the first spring member 310. That is, in such examples, the intermediate portion 312 includes the first opening 318, which is positioned on a side of the first body 316. The first opening 318 allows for positioning of spring member(s) in the first cavity 314. As shown in FIG. 3, the first spring member 310 extends through and/or is at least partially positioned in the first opening 318. Further, in such examples, the first opening 318 is configured to receive at least a portion (e.g., a tab) of the output portion 306 and/or at least a portion (e.g., a tab) of the input portion 308.

To facilitate providing and/or generating the second torque associated with the damper assembly 300, the output portion 306 of FIG. 3 is configured to receive one or more biasing forces from the first spring member 310 and/or one or more other spring members of the damper assembly 300, for example, when the spring member(s) 310 are compressed. In some examples, the output portion 306 of FIG. 3 includes a second example body (e.g., an annular body) 320 that is relatively non-rotatably (i.e., fixedly) coupled to the turbine 304 and/or an associated hub (e.g., the second hub 554 discussed below) of the vehicle torque converter 200, for example, via one or more fasteners and/or one or more fastening methods or techniques. As a result of such coupling, the second torque is transferrable from the output portion 306 of the damper assembly 300 to the turbine 304 and/or the associated hub. Additionally, in some examples, the output portion 306 includes a first example tab (e.g., a first output tab) 322 positioned at or adjacent a first end (e.g., a distal end) 324 of the second body 320, which facilitates changing a state of the first spring member 310 cooperatively with the intermediate portion 312 and/or the input portion 308. In particular, the first tab 322 of the output portion 306 is engaged with and/or configured to engage the first spring member 310. The second body 320 of FIG. 3 extends away from the first tab 322 of the output portion 306 radially inward relative to the first axis 210 alongside a housing or first shell (e.g., a turbine shell) 326 of the turbine 304 toward a second end (e.g., a proximal end) 558 (shown in FIG. 5) of the second body 320 opposite the first end 324. In some examples, the second body 320 has a thickness that is substantially uniform across a radius of the second body 320 between the first and second ends 324, 558 of the second body 320.

The input portion 308 of FIG. 3 is configured to receive the first torque from an example piston 330 of the clutch 302 and apply the first torque to the first spring member 310 and/or one or more other spring members of the damper assembly 300. In some examples, the input portion 308 of FIG. 3 includes a third example body (e.g., an annular body) 328 that is relatively non-rotatably (i.e., fixedly) coupled to the piston 330, for example, via one or more fasteners (e.g., one or more rivets, etc.) 332 and/or one or more example fastening methods or techniques. For example, the fastener(s) 332 of FIG. 3, which may be radially distributed relative to the first axis 210, extend through the third body 328 and the piston 330. Additionally, in some examples, the input portion 308 includes a first tab (e.g., a first input tab) 334 positioned at or adjacent a first end (e.g., a distal end) 336 of the third body 328, which facilitates changing the state of the first spring member 310 cooperatively with the intermediate portion 312 and/or the output portion 306. In particular, the first tab 334 of the input portion 308 is engaged with and/or configured to engage the first spring member 310. The third body 328 of FIG. 3 extends away from the first tab 334 of the input portion 308 radially inward relative to the first axis 210 alongside the intermediate portion 312 and the piston 330 toward a second end (e.g., a proximal end) 714 (shown in FIG. 7) of the third body 328 opposite the first end 336. In some examples, the third body 328 has a thickness that is substantially uniform across a radius of the third body 328 between the first and second ends 336, 714 of the third body 328.

As shown in FIG. 3, each of the first tab 322 of the output portion 306 and the first tab 334 of the input portion 308 is positioned in the first cavity 314 adjacent (a) a portion (e.g., an end) of the first spring member 310 and/or (b) a portion of a first seat (e.g., a spring seat) 338 of the damper assembly 300. In some examples, the first tab 322 of the output portion 306 and the first tab 334 of the input portion 308 are substantially concentric relative to each other. As shown in FIG. 3, the first tab 322 of the output portion 306 is positioned radially inward relative to the first tab 334 of the input portion 308. In other words, the first tab 334 of the input portion 308 is positioned radially outward relative to the first tab 322 of the output portion 306. However, in some examples, the first tabs 322, 334 of the respective output and input portions 306, 308 are positioned differently relative to each other while still maintaining sufficient damper performance associated with of the damper assembly 300.

In some examples, each of the first body 316 of FIG. 3, the second body 320 of FIG. 3, and/or the third body 328 of FIG. 3 can be implemented, for example, using at least one plate that is substantially annular. In such examples, the output portion 306 of the damper assembly 300 is sometimes referred to as a driven plate. Further, in such examples, the input portion 308 of the damper assembly 300 is sometimes referred to as a retainer plate. Further still, in such examples, the intermediate portion 312 of the damper assembly 300 is sometimes referred to as an intermediate plate. Additionally, the first body 316 of FIG. 3, the second body 320 of FIG. 3, and/or the third body 328 of FIG. 3 can be constructed of one or more materials having suitable properties for use with a torque converter such as, for example, one or more metals (e.g., any of steel, aluminum, etc.).

As shown in FIG. 3, the intermediate portion 312 is positioned between the input portion 308 and the piston 330. In some examples, the intermediate portion 312 is rotatable relative to one or more (e.g., all) of the output portion, 306, the input portion 308, and/or the piston 330. In such examples, the intermediate portion 312 is slidably interposed between the input portion 308 and the piston 330, which facilitates maintaining a position and/or an orientation of the intermediate portion 312 relative to the housing 211 of the torque converter 200. For example, the intermediate portion 312 of FIG. 3 includes a first guide surface (e.g., an annular surface) 340 and a second guide surface (e.g., an annular surface) 342 positioned on the first body 316 opposite relative to each other. The first guide surface 340 of the intermediate portion 312 is configured to directly contact and/or slide against a first guide surface (e.g., an annular surface) 344 of the input portion 308 that is adjacent or proximate to the first guide surface 340 of the intermediate portion 312, which substantially prevents the intermediate portion 312 from moving in a first axial direction (e.g., a horizontal direction) 346 toward the turbine 304. As shown in FIG. 3, the first guide surface 344 of the input portion 308 is positioned on the first tab 334 of the input portion 308. Accordingly, in some examples, the first tab 334 of the input portion 308 or at least a portion thereof is configured to engage (e.g., slidably engage) the first guide surface 340 of the intermediate portion 312 to prevent such movement of the intermediate portion 312 in the first axial direction 346. On the other hand, the second guide surface 342 of the intermediate portion 312 is configured to directly contact and/or slide against a guide surface 346 of the piston 330 that is adjacent or proximate to the second guide surface 344 of the input portion 308, which substantially prevents the intermediate portion 312 from moving in a second axial direction (e.g., a horizontal direction) 350, opposite the first axial direction 346, toward the cover 202. Accordingly, in some examples, the piston 330 of FIG. 3 is configured to engage (e.g., slidably engage) the second guide surface 342 of the intermediate portion 312 to prevent such movement of the intermediate portion 312 in the second axial direction 350. In this manner, the first tab 334 of the input portion 308 and the piston 330 are configured axially guide the intermediate portion 312 during operation of the vehicle torque converter 200.

As shown in FIG. 3, the first guide surface 344 of the input portion 308 extends radially relative to the first axis 210 alongside the first guide surface 340 of the intermediate portion 312. Further, as shown in FIG. 3, the guide surface 348 of the piston 330 extends radially relative to the first axis 210 alongside the second guide surface 342 of the intermediate portion 312.

According to the illustrated example of FIG. 3, the torque converter 200 includes the damper assembly 300, the clutch 302, the turbine 304, and an example fluid (e.g., torque fluid) 352, each of which is disposed in a housing cavity (e.g., a substantially sealed cavity) 354 formed by the torque converter housing 211. In particular, the turbine 304 of FIG. 3 is configured to receive the fluid 352 from the impeller 204 during engine operation (e.g., when the clutch 302 is disengaged), thereby generating an output torque of the torque converter 200 that is provided to the transmission system 104. For example, the impeller 204 includes one or more fluid flow control members (e.g., fins, blades, vanes, etc.) and a housing or second shell (e.g., an impeller shell) on which the fluid flow control member(s) are positioned. The fluid flow control member(s) of the impeller 204 are radially distributed relative to the first axis 210 and extend radially outward relative to the first axis 210. Similarly, the turbine 304 of FIG. 3 includes one or more fluid flow control members (e.g., fins, blades, vanes, etc.) 356 positioned on the first shell 326 of the turbine 304. The fluid flow control members 356 of the turbine 304 are radially distributed relative to the first axis 210 and extend radially outward relative to the first axis 210. As the fluid flow control members of the impeller 204 rotate together with the cover 202 relative to the first axis 210, the fluid 352 is urged and/or pumped radially outward relative to the first axis 210 toward the fluid flow control members 356 of the turbine 304. That is, the fluid flow control members of the impeller 204 direct a flow of the fluid 352 onto the fluid flow control members 356 of the turbine 304 such that the fluid 352 imparts fluid force(s) on the fluid flow control members 356 of the turbine 304. The turbine 304 of FIG. 3 generates the output torque of the torque converter 200 as a result of such fluid interaction, a degree of which is based on one or more parameters associated with the torque converter 200 such as, for example, one or more of a rotational speed of the impeller 204, a rotational speed of the turbine 304, angles of the respective fluid flow control members 356, lengths of the respective fluid flow control members 356, properties (e.g., viscosity) of the fluid 352, etc.

According to the illustrated example of FIG. 3, the clutch 302 is operatively coupled to the vehicle torque converter 200. To facilitate clutch operation, the clutch 302 of FIG. 3 includes the piston 330. The piston 330 of FIG. 3 is moveable in the first axial direction 346 and/or the second axial direction 350 (e.g., based on fluid pressure differential applied to the piston 330 by the fluid 352), which facilitates changing a state of the clutch 302. In particular, the clutch 302 of FIG. 3 is changeable between a first state (e.g., a disengaged state) thereof and a second state (e.g., a fully engaged state or a partially engaged state) thereof, for example, based on a flow of the fluid 352 through the housing 211 provided by the hydraulic system 110. The first state of the clutch 302 corresponds to the first operating mode of the torque converter 200. That is, the clutch 302 provides the first operating mode of the torque converter 200 when the clutch 302 is in the first state thereof. Further, the second state of the clutch 302 corresponds to the second operating mode of the torque converter 200. That is, the clutch 302 provides the second operating mode of the torque converter 200 when the clutch 302 is in the second state thereof.

The piston 330 of FIG. 3 can be implemented, for example, using an annular body such as a plate. The piston 330 of FIG. 3 is sized and/or shaped to fit between the cover 202 and the damper assembly 300. According to the illustrated example of FIG. 3, the piston 330 is supported by a portion (e.g., a hub such as a collar hub positioned on the cover 202) of the torque converter 200 such that the piston 330 is rotatable relative to the portion of the torque converter 200 about the first axis 210. Further, as shown in FIG. 3, the piston 330 of FIG. 3 has a face (e.g., an annular surface) 358 positioned proximate to a face (e.g., an annular surface) 360 of the cover 202.

In some examples, to provide the second state of the clutch 302 during a lockup on operation of the torque converter 200, the face 358 of the piston 330 of FIG. 3 is configured to engage (e.g., slidably engage) the face 360 of the cover 202 to generate friction for the torque converter 200. Such frictional engagement of the piston 330 and the cover 202 provides a mechanical connection between the cover 202 and the piston 330 and, consequently, between the cover 202 and the input portion 308. For example, when the controller 105 initiates and/or executes the lockup on operation, the fluid 352 urges the piston 330 in the second axial direction 350 toward and/or into engagement with the cover 202, thereby transferring a torque (e.g., the engine torque generated by the engine 102) from the cover 202 to the input portion 308 of the damper assembly 300. In such examples, the controller 105 directs the hydraulic system 110 to control the fluid 352 in the housing 211 to apply a first differential fluid pressure to the piston 330 that causes the piston 330 to move in the second axial direction 350 such that the face 358 of the piston 330 and the face 360 of the cover 202 contact and/or impart frictional forces on each other. In this manner, disclosed examples actuate the piston 330 of FIG. 3 to provide the second state of the clutch 302. Such a state change of the clutch 302 may cause the input portion 308 to rotate about the first axis 210 relative to the output portion 306 and/or the intermediate portion 312.

On the other hand, in some examples, to provide the first state of the clutch 302 during a lockup off operation of the torque converter 200, the face 358 of the piston 330 of FIG. 3 is configured to disengage (e.g., separate) from the face 360 of the cover 202, which disconnects the cover 202 from the piston 330 and, consequently, disconnects the cover 202 from the input portion 308. That is, the friction associated with the piston 330 and the cover 202 is substantially reduced and/or eliminated when the piston 330 disengages from the cover 202. For example, when the controller 105 initiates and/or executes the lockup off operation, the fluid 352 urges the piston 330 in the first axial direction 346 away from the cover 202 to disengage the piston 330 from the cover 202, thereby substantially ceasing torque transfer between the cover 202 and the input portion 308. In such examples, the controller 105 directs the hydraulic system 110 to control the fluid 352 in the housing 211 to apply a second differential fluid pressure to the piston 330, different from the first differential pressure, that causes the piston 330 to move in the first axial direction 346. In this manner, disclosed examples also actuate the piston 330 of FIG. 3 to provide the first state of the clutch 302. The resulting second differential fluid pressure may cause the piston 330 to completely separate from the cover 202 whereby no portion of the piston 330 contacts the cover 202. For example, a relatively small gap may exist between the piston 330 and the cover 202 when the clutch 302 is in the first state thereof. However, in some examples, the second differential fluid pressure may allow the piston 330 to slightly contact the cover 202 whereby a substantially negligible amount of friction is generated by the piston 330 and the cover 202.

In some examples, when in the second state and/or transitioning from the first state to the second state, the clutch 302 is configured to slip (e.g., at a gradual decreasing angular rate). For example, the piston 330 and the cover 202 slide against each other as the first differential fluid pressure applied to the piston 330 increases. In such examples, the controller 105 is configured to direct the hydraulic system 110 to adjust such slipping of the clutch 302, for example, by particularly increasing the first differential fluid pressure during a time interval. Further, when the first differential fluid pressure is at or above a locking threshold (e.g., a value corresponding to a particular differential fluid pressure), the clutch 302 ceases slipping and/or otherwise locks up. For example, the piston 330 and the cover 202 non-relatively rotatably couple together (e.g., temporarily) while first differential fluid pressure remains at or above the locking threshold.

According to the illustrated example of FIG. 3, the first spring member 310 includes an inner radial portion 362 positioned at or adjacent a first radius (e.g., an inner radius) 364 associated with the damper assembly 300 and an outer radial portion 366 positioned at or adjacent a second radius (e.g., an outer radius) 368 associated with the damper assembly 300 larger than the first radius 364. That is, the outer radial portion 366 is positioned radially outward relative to the inner radial portion 362 of the first spring member 310.

According to the illustrated example of FIG. 3, the first body 316 of the intermediate portion 312 includes a first portion (e.g., an inner radial portion) 370, a second portion (e.g., a central portion) 372, and a third portion (e.g., an outer radial portion) 374 that are connected and/or coupled together. In some examples, the first portion 370, the second portion 372, and the third portion 374 of the intermediate portion 312 are an integral or single-piece component such that the first, second, and third portions 370, 372, 374 of the intermediate portion 312 form and/or define a first cross-sectional area 375 (i.e., the same cross-sectional area) of the first body 316. In other words, in such examples, the first body 316 includes the first cross-sectional area 375, which is shared by all of the first, second, and third portions 370, 372, 374 of the first body 316. As shown in FIG. 3, the first cross-sectional area 375 of the first body 316 is substantially U-shaped or C-shaped. In such examples, a side of the first cross-sectional area 375 corresponding to the first opening 318 is sometimes referred to as an open side of the first cross-sectional area 375. Such a shape associated with the first body 316 substantially increases rigidity and/or strength of the intermediate portion 312 and, as a result, reduces deformation (e.g., radial deformation) of the intermediate portion 312 while the intermediate portion 312 is rotating relative to the first axis 210. Thus, some disclosed examples improve damper performance via the intermediate portion 312. Additionally or alternatively, such a shape associated with the first body 316 provides effective radial guidance to the first spring member 310 and/or to one or more other spring members of the damper assembly 300, which facilitates installing the spring member(s) 310 on the damper assembly 300 and/or maintaining proper operation of the damper assembly 300, as discussed further below.

In some examples, the first portion 370 of first body 316 corresponds to an area of the intermediate portion 312 that is positioned at or adjacent the first radius 364 and faces radially outward relative to the first axis 210. Further, in some examples, the third portion 374 of the first body 316 corresponds to an area of the intermediate portion 312 positioned at or adjacent the second radius 368 and faces radially inward relative to the first axis 210.

Additionally, in some examples, to facilitate providing radial guidance to the intermediate portion 312, the input portion 308 of FIG. 3 includes an example lip 376 positioned on and/or coupled to the third body 328. In particular, the lip 376 of the input portion 308 extends and/or curves away from the third body 328 toward the output portion 306 to define a second example guide surface (e.g., an outer circumferential surface) 378 of the output portion 306 that is configured to engage (e.g., slidably engage) an inner surface (e.g., an inner circumferential surface) 380 of the first body 316. For example, during damper operation, at least a portion of lip 376 directly contacts and/or slides against the first portion 370 of the first body 316. In some examples, the lip 376 of FIG. 3 is discontinuous. That is, in such examples, the lip 376 does not extend entirely around the first axis 210. In some such examples, the lip 376 of FIG. 3 includes multiple segments that are radially distributed relative to the first axis 210, each of which is configured to engage (e.g., slidably engage) first body 316 to radially guide the intermediate portion 312. In any case, the lip 376 of FIG. 3 is positioned radially inward relative to the intermediate portion 312.

Figure 4:
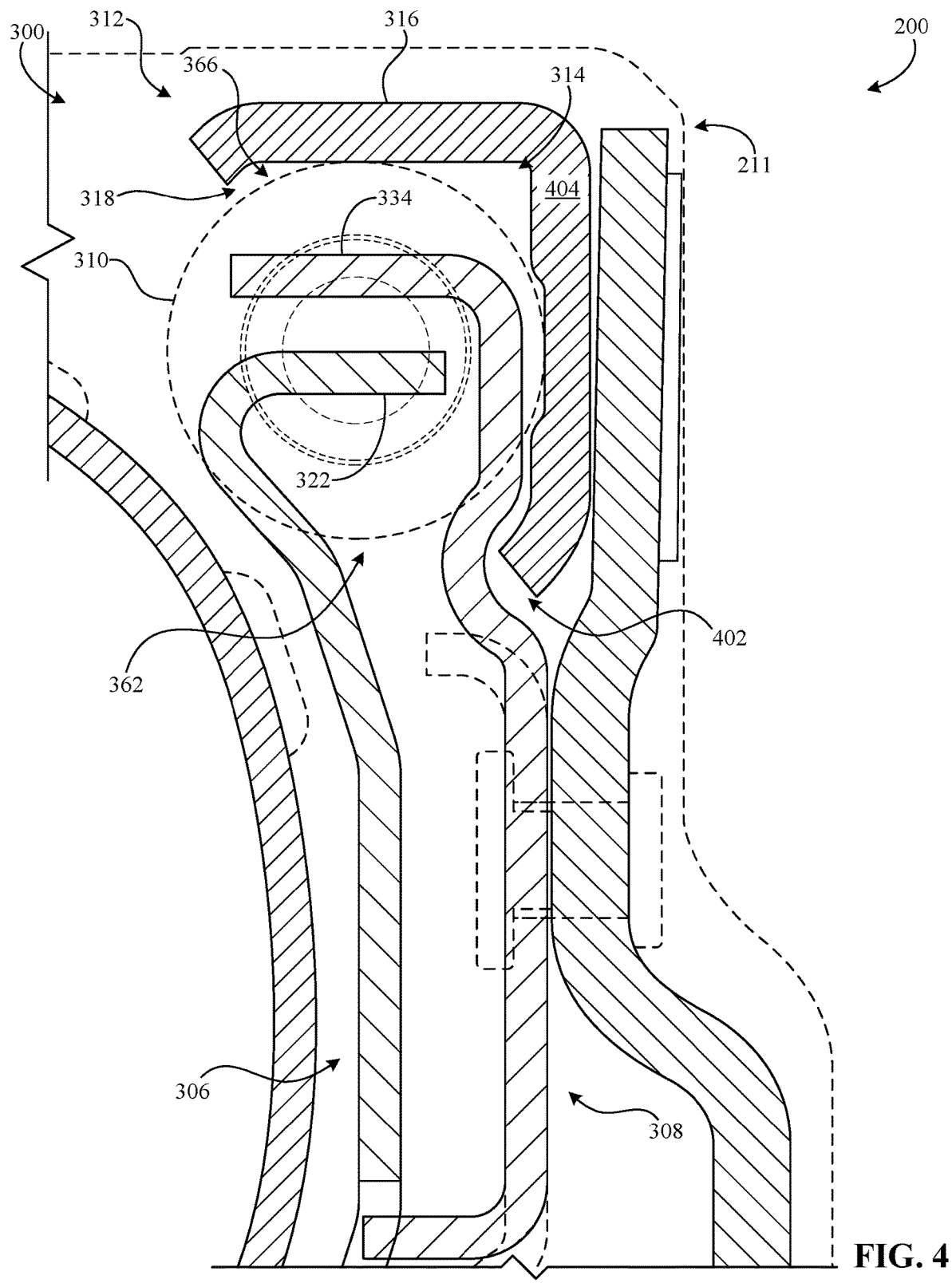
FIG. 4 is a partial cross-sectional view of the example torque converter of FIG. 2 along line B-B and shows an example damper assembly in accordance with the teachings of this disclosure.

FIG. 4 is a partial cross-sectional view of the torque converter 200 of FIG. 2 along line B-B and shows the damper assembly 300 of FIG. 3. According to the illustrated example of FIG. 4, the intermediate portion 312 includes a first example cutout 402 positioned on the first body 316, which allows the output portion 306 and/or the input portion 308 to rotate relative to the intermediate portion 312 without interfering with the intermediate portion 312. Such a cutout 402 is efficient to minimize an axial space in the torque converter housing 211 used by the damper assembly 300. In some examples, the first cutout 402 is formed and/or defined by the opening 318 such that the first cutout 402 is an extension of the opening 318. As shown in FIG. 4, each of the first tab 322 of the output portion 306 and the first tab 334 of the input portion 308 at least partially enters the first cavity 314 of the intermediate portion 312 via the first cutout 402. That is, in some examples, each of the first tab 322 of the output portion 306 and the first tab 334 of the input portion 308 extends through the first cutout 402 and/or is at least partially positioned in the first cutout 402. Additionally, in such examples, the first cutout 402 at least partially exposes the inner radial portion 362 of the first spring member 310. Further, in some examples where the damper assembly 300 includes one or more other spring members in addition to the first spring member 310, the first cutout 402 at least partially exposes an inner radial portion of at least one of the other spring member(s) such as, for example, the second spring member 510 discussed below.

According to the illustrated example of FIG. 4, the first body 316 of the intermediate portion 312 includes a second cross-sectional area 404 different from the first cross-sectional area 375. In some examples, only the second and third portions 372, 374 of the first body 316 form and/or define the second cross-sectional area 404 but not the first portion 370. In such examples, the first portion 370 of the first body 316 does not exist in the second cross-sectional area 404. Unlike the first cross-sectional area 375 of FIG. 3, the second cross-sectional area 404 of the first body 316 is substantially L-shaped. Such a shape of the first body 316 reduces a packaging size associated with the damper assembly 300 by decreasing an axial space occupied by the components of the damper assembly 300. Further, in such examples, the second cross-sectional area 404 of the first body 316 does not provide inner radial guidance to the first spring member 310 or any other spring member of the damper assembly 300. Although FIG. 4 depicts the single cutout 402, in some examples, the intermediate portion 312 is implemented differently. In such examples, the intermediate portion 312 includes one or more other cutouts positioned on the first body 316 in addition or alternatively to the first cutout 402, as discussed in greater detail below in connection with FIG. 9. Further, although FIG. 4 depicts aspects in connection with the single cutout 402, in some examples, such aspects likewise apply to the other cutout(s) of the intermediate portion 312 such as, for example, the second cutout 910 and/or the third cutout 912 discussed below.

Figure 5:
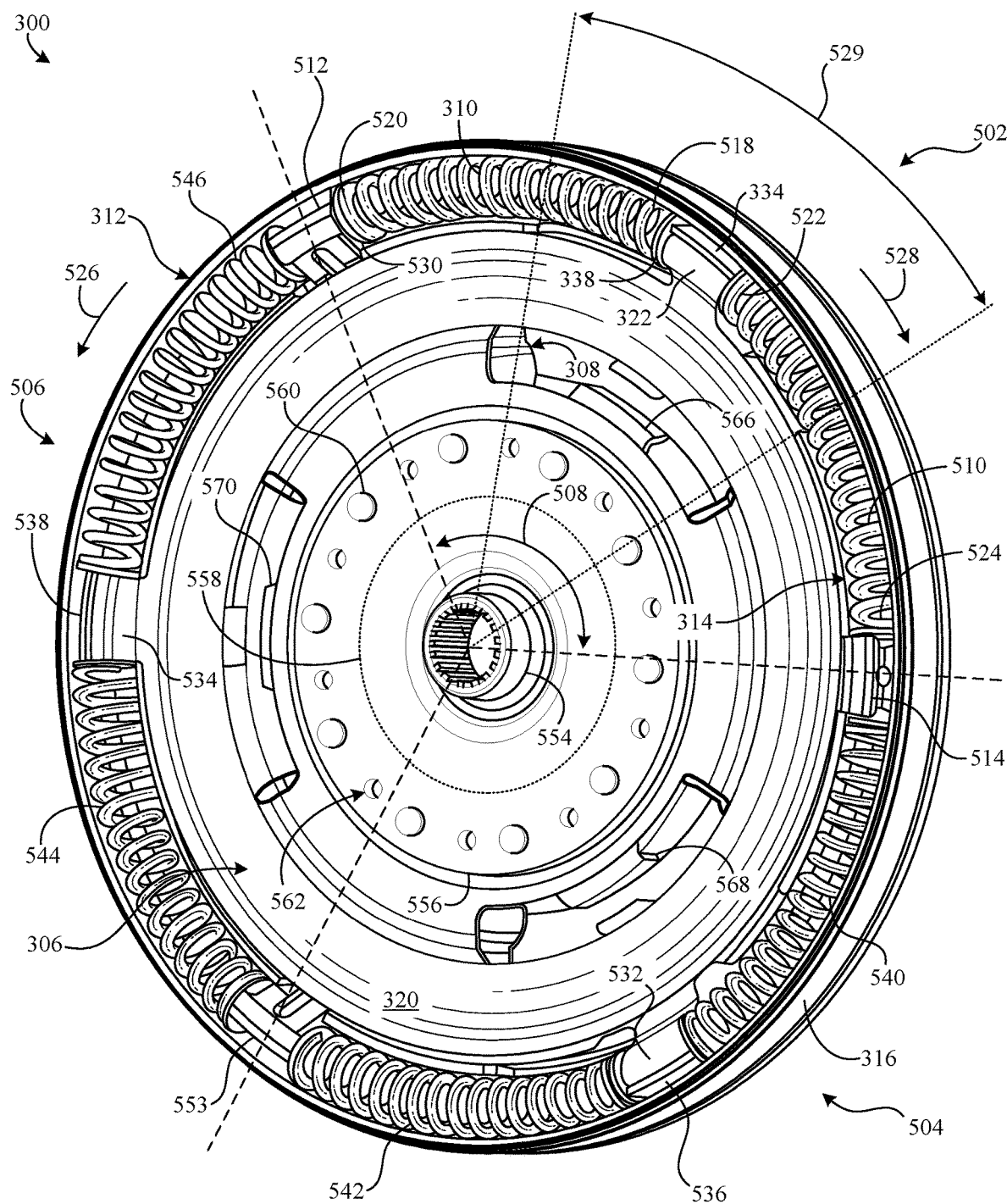
FIG. 5 is a detailed view of an example damper assembly in accordance with the teachings of this disclosure.

FIG. 5 is a detailed view of the damper assembly 300 of FIGS. 3 and 4. According to the illustrated example of FIG. 5, the damper assembly 300 has been substantially removed and/or separated from the torque converter 200, for clarity. The damper assembly 300 of FIG. 5 includes multiple sectors (e.g., circular sectors) 502, 504, 506, three of which are shown in this example (i.e., a first sector 502, a second sector 504, and a third sector 506). The first, second, and third sectors 502, 504, 506 of the damper assembly 300 are substantially equal in size relative to each other, which divide the damper assembly 300 into three substantially equal portions, as shown in FIG. 5. For example, each of the first, second, and third sectors 502, 504, 506 of FIG. 5 is associated with and/or corresponds to an example angle 508 (i.e., the same angle), which is substantially 120 degrees in the illustrated example of FIG. 5. As shown in FIG. 5, each of the first tab 322 of the output 306, the first tab 334 of the input portion 308, and the first spring member 310 is positioned in the first sector 502 of the damper assembly 300.

According to the illustrated example of FIG. 5, the damper assembly 300 of FIG. 5 also includes a second example spring member (e.g., a compression spring) 510 positioned in the first sector 502 and operatively coupled to the output and input portions 306, 308. The second spring member 510 is positioned in and/or extends through the first cavity 314 adjacent the first spring member 310. As shown in FIG. 5, each of the first tabs 322, 334 of the respective the output and input portions 306, 308 are positioned between the first and second spring members 310, 510. In particular, to facilitate transferring torque from the first tab 334 of the input portion 308 to the first tab 334 of the output portion 306, the intermediate portion 312 of FIG. 5 includes a first example tab (e.g., a first transfer tab) 512 and a second example tab (e.g., second transfer tab) 514 between which the first spring member 310 and the second spring member 510 are positioned. Each of the first and second tabs 512, 514 of the intermediate portion is relatively non-rotatably coupled to the first body 316, for example, via one or more fasteners and/or one or more example fastening methods or techniques. For example, the first body 316, the first tab 512, and the second tab 514 are formed together as an integral or single-piece component.

The first spring member 310 of FIG. 5 is configured to generate a force (e.g., a damping force) when the first spring member 310 compresses, decompresses, and/or otherwise changes between a first spring state (e.g., a substantially uncompressed state of the first spring member 310) and a second spring state (e.g., substantially compressed state of the first spring member 310). The first spring member 310 can be implemented, for example, using a compression spring such as a helical coil compression spring. According to the illustrated example of FIG. 5, the first spring member 310 includes a first end 518 and a second end 520 opposite relative to the first end 518 of the first spring member 310. In some examples, the first tab 512 of the intermediate portion 312 is engaged with and/or configured to engage the second end 520 of the first spring member 310. Further, each of the first tab 322 of the output portion 306 and the first tab 334 of the input portion 308 is engaged with and/or configured to engage the first end 518 of the first spring member 310. As such, in some examples, the first spring member 310 is operatively interposed and/or operatively coupled between (a) the first tab 512 of the intermediate portion 312 and (a) both of the first tab 322 of the output portion 306 and the first tab 334 of the input portion 308.

Similar to the first spring member 310, the second spring member 510 of FIG. 5 is configured to generate a force (e.g., a damping force) when the second spring member 510 compresses, decompresses, and/or otherwise changes between a first spring state (e.g., a substantially uncompressed state of the second spring member 510) and a second spring state (e.g., substantially compressed state of the second spring member 510). The second spring member 510 can be implemented, for example, using a compression spring such as a helical coil compression spring. According to the illustrated example of FIG. 5, the second spring member 510 includes a first end 522 and a second end 524 opposite the first end 522 of the second spring member 510. In some examples, the second spring member 510 is operatively interposed and/or operatively coupled between (a) the second tab 514 of the intermediate portion 312 and (b) both of the first tab 322 of the output portion 306 and the first tab 334 of the input portion 308. For example, the second tab 514 of the intermediate portion 312 is engaged with and/or configured to engage the second end 524 of the second spring member 510. Further, each of the output portion 306 and the input portion 308 is engaged with and/or configured to engage the first end 522 of the spring member 510. In this manner, the first spring member 310, the second spring member 510, the first tab 322 of the output portion 306, and the first tab 334 of the input portion 308, together, are operatively interposed and/or operatively coupled between the first and second tabs 512, 514 of the intermediate portion 312. Further, in such examples, the each of the first tab 322 of the output portion 306 and the first tab 334 of the input portion 308 is operatively interposed and/or operatively coupled between the first and second spring member 310, 510. As shown in FIG. 5, the first end 518 of the first spring member 310 and the first end 522 of the second spring member 510 face each other.

In some examples, during operation of the torque converter 200 when the clutch 302 is in or transitioning to the second state thereof, the entire damper assembly 300 rotates in the same rotational direction. In such examples, the first tab 334 of input portion 308 is in a first position (e.g., a starting or neutral position associated with equilibrium) relative to (a) the first tab 322 of the output portion 306 and (b) the first tab 512 of the intermediate portion 312. In particular, when one or more torsional vibrations are introduced to and/or otherwise exist in the first torque, at least a portion of the first torque transferred from the piston 330 to the input portion 308 causes the input portion 308 to rotate and/or accelerate in a first rotational direction (e.g., clockwise or counterclockwise) 526 relative to the output portion 306 and/or the intermediate portion 312. As a result of such relative movement associated with the output, input, and/or intermediate portions 306, 308, 312, the first tab 334 of the input portion 308 moves through the first cavity 314 toward the first tab 512 of the intermediate portion 312 (i.e., away from the first position of the first tab 334), thereby compressing the first spring member 310 and/or otherwise causing the first spring member 310 to change from the first spring state to the second spring state. The first tab 334 of the input portion 308 may move relative to both the first tab 512 of the intermediate portion 312 and the first tab 322 of the output portion 306 while the first spring member 310 changes state. In some examples, when in the second spring state, the first spring member 310 is configured to generate a first force and apply the first force to the first tab 512 of the intermediate portion 312, which causes the intermediate portion 312 to rotate and/or accelerate in the first rotational direction 526 relative to the output portion 306 together with the input portion 308. The first force generated by the first spring member 310 is based on, for example, (a) an angle of rotation of the input portion 308 relative to the intermediate portion 312 and/or (a) one or more parameters (e.g., any of a compression rate, a spring diameter, a wire diameter, a spring free length, etc.) of the first spring member 310. In some example, such parameter(s) of the first spring member 310 are selected and/or predefined to provide a sufficient magnitude of the first force across a desired operating range of the first spring member 310.

Further, as a result of rotation of the intermediate portion 312 relative to the output portion 306, the second tab 514 of the intermediate portion 312 moves through the first cavity 314 toward the first tab 322 of the output portion 306, thereby compressing the second spring member 510 and/or otherwise causing the second spring member 510 to change from the first spring state to the second spring state. As such, each of the first tab 512 of the intermediate portion 312 and/or the second tab 514 of the intermediate portion 312 is configured to transfer force(s) between the first spring member 310 and the second spring member 510 as the input portion 306 and the output portion 308 rotate relative to each other. In some examples, when in the second spring state, the second spring member 510 is configured to generate a second force (e.g., a damping force) and apply the second force to the first tab 322 of the output portion 306, which may be resisted by the output portion 306 due to an inertia associated with the output portion 306. The second force generated by second spring member 510 is based on, for example, (a) an angle of rotation of the intermediate portion 312 relative to the output portion 306 and/or (a) one or more parameters (e.g., any of a compression rate, a spring diameter, a wire diameter, a spring free length, etc.) of the second spring member 510. In some example, such parameter(s) of the second spring member 510 are selected and/or predefined to provide a sufficient magnitude of the second force across an operating range of the second spring member 510.

Then, when the first spring member 310 and the second spring member 510 are fully or sufficiently compressed, the first spring member 310 and the second spring member 510, together, are configured to urge the first tab 334 of the input portion 308 to return the first position. In some examples, the first and second forces generated by the first and second spring members 310, 510 cause the first tab 334 of the input portion 308 to rotate relative to the first tab 322 of the output portion 306 in a second rotational direction 528 opposite the first rotational direction 526, thereby decompressing each of the first and second spring members 310, 510 and/or otherwise causing each of the first and second spring members to change from the second spring state to the first spring state. In this manner of damper operation, the damper assembly 300 effectively reduces and/or mitigates the torsional vibration(s) that the torque converter 200 receives from the engine 102 and provides a regulated torque to the transmission system 104 while the clutch 302 is in the second state thereof. In other words, the damper assembly 300 of FIG. 3 effectively dampens rotation of the input portion 308 relative to the output portion 308. As a result of such damper operation, the damper assembly 300 prevents the transmission system 104 and/or any other drivetrain or driveline component of the vehicle 100 from wearing, degrading, and/or otherwise receiving damage that would have otherwise been caused by an undamped vibration or raw, unregulated engine torque. Although FIG. 5 depicts aspects in connection with the first tab 322 of the input portion 306, the first tab 334 of the output portion 308, the first tab 512 of the intermediate portion 312, and the second tab 514 of the intermediate portion, in some examples, such aspects likewise apply to one or more other tabs associated with the damper assembly 300, as discussed further below.

According to the illustrated example of FIG. 5, the damper assembly 300 structured and/or configured such that each of the output portion 306 and/or the input portion 308 is rotatable relative to the intermediate portion 312 at least partially or entirely across a first example angle of rotation 529 during damper operation. The first angle of rotation 529 of FIG. 5 corresponds to an angular travel (e.g., a maximum angular travel) of the damper assembly 300. In some examples, a value corresponding to the angle of rotation 529 is substantially 44 degrees or more.

In some examples, to facilitate spring compression and decompression, the damper assembly 300 of FIG. 5 also includes one more seats (e.g., spring seats) 338, 530, two of which are shown in this example (sometimes referred to as a first pair of seats). That is, the damper assembly 300 of FIG. 5 includes the first seat 338 and a second seat 530 between which the first spring member 310 is positioned. The first and second seats 338, 530 are coupled to the respective first and second ends 518, 520 of the first spring member 310. As shown in FIG. 5, the first seat 338 of FIG. 5 is interposed between and/or pressed between (a) the first end 518 of the first spring member 310 and (b) the first tab 322 of the output portion 306 and/or the first tab 334 of the input portion 308. In particular, in response to the first tab 322, 334 of the output or input portion 306, 308 applying a force to the first seat 338, the first seat 338 is configured to distribute the force on the second end 520 of the first spring member 310. Additionally, the second seat 530 is interposed between and/or pressed between the second end 520 of the first spring member 310 and the first tab 512 of the intermediate portion 312. In particular, in response to the first tab 512 of the intermediate portion 312 applying a force to the second seat 530, the second seat 530 is configured to distribute the force on the second end 520 of the first spring member 310. In such examples, the state of the first spring member 310 changes when first and second seats 338, 530 move toward and/or away from each other. Although FIG. 5 depicts the first pair of seats 338, 530, in some examples, the damper assembly 300 of FIG. 5 is implemented differently, for example, using one or more other pairs of seats similar to the first pair of seats 338, 530. For example, the damper assembly 300 may include a second pair of seats between which the second spring member 510 is positioned. As such, although FIG. 5 depicts aspects in connection with the first pair of seats 338, 530, in some examples, such aspects likewise apply to the other pair(s) of seats of the damper assembly 300.

In some examples, the first spring member 310, the second spring member 510, the first tab 322 of the output portion 306, the first tab 334 of the input portion 308, the first tab 512 of the intermediate portion 312, and the second tab 514 of the intermediate portion 312, together, form and/or define a first example mechanism of the damper assembly 300 that corresponds to the first sector 502. Additionally, in some examples, the damper assembly 300 of FIG. 5 includes one or more other example mechanisms (e.g., similar to the first mechanism) corresponding to one or more other ones of the sectors 504, 506 in addition or alternatively to the first mechanism, two of which are shown in this example. As such, although FIG. 5 depicts aspects in connection with the first mechanism, in some example, such aspects likewise apply to the other mechanism(s) of the damper assembly 300.

In such examples, the output portion 306 includes one or more tabs (e.g., output tabs) 532, 534 positioned on and/or coupled to the second body 320 in addition to the first tab 322 of the output portion 306, two of which are shown in this example. That is, the output portion 306 of FIG. 5 includes a second tab (e.g., a second output tab) 532 and a third tab (e.g., a third output tab) 534 for engaging one or more spring members of the damper assembly 300. As shown in FIG. 5, the first, second, and third tabs 322, 532, 534 of the output portion 306 are radially distributed relative to the first axis 210. Further, in such examples, the input portion 308 also includes one or more tabs (e.g., input tabs) 536, 538 positioned on and/or coupled to the third body 328 in addition to the first tab 334 of the input portion 308, two of which are shown in this example. That is, the input portion 308 of FIG. 5 includes a second tab (e.g., a second input tab) 536 and a third tab (e.g., a third input tab) 538 for engaging one or more spring members of the damper assembly 300. As shown in FIG. 5, the first, second, and third tabs 334, 536, 538 of the input portion 308 are radially distributed relative to the first axis 210. Further still, the damper assembly 300 also includes one or more other spring members 540, 542, 544, 546 in addition to the first and second spring members 310, 510, four of which are shown in this example. That is, the damper assembly 300 of FIG. 5 also includes a third spring member (e.g., a compression spring) 540, a fourth spring member (e.g., a compression spring) 542, a fifth spring member (e.g., a compression spring) 544, and a sixth spring member (e.g., a compression spring) 546, each of which may be provided with a pair of spring seats, similar to the first and second spring members 310, 510. Each of the spring members 310, 510, 540, 542, 544, 546 of the damper assembly 300 can be implemented, for example, using a compression spring such as a helical coil compression spring. Additionally or alternatively, in some examples, at least some or all of the spring members 310, 510, 540, 542, 544, 546 of the damper assembly 300 can be implemented using one or more other springs, any other suitable damping member(s), or a combination thereof. In any case, the spring members 310, 510, 540, 542, 544, 546 of FIG. 5 are sometimes referred to as primary spring members of the damper assembly 300.

According to the illustrated example of FIG. 5, the first tab 512 of the intermediate portion 312 is operatively coupled and/or operatively interposed between the first spring member 310 and the sixth spring member 546 Further, the second tab 514 of the intermediate portion 312 is operatively coupled and/or operatively interposed between the second spring member 510 and the third spring member 540. Additionally, in some examples, the intermediate portion 312 includes a third example tab (e.g., a third transfer tab) 553 positioned on the first body 316. In such examples, the third tab 553 is operatively coupled and/or operatively interposed between the fourth spring member 542 and the fifth spring member 544. As shown in FIG. 5, the input portion 308 is behind and/or beneath the output portion 306. For example, the second body 320 of the output portion 306 of FIG. 5 substantially covers an outer surface of the first body 316 of the input portion 308.

Additionally, in some examples, to facilitate connecting the transmission system 104 to the torque converter 200, the torque converter 200 includes a second example hub (e.g., a turbine hub) 554, which is sometimes referred to as an output of the torque converter 200. In particular, the second hub 554 of FIG. 5 is sized, shaped, structured, and/or otherwise configured to receive the first shaft 208 and provide the output torque generated by the turbine 304 to the first shaft 208. In such examples, the second hub 554 defines an inner surface (e.g., an inner circumferential surface) having grooves that are positioned thereon, and the first shaft 208 defines an outer surface (e.g., an outer circumferential surface) having splines that are positioned thereon. In such examples, the grooves of the second hub 554 receive the splines of the first shaft 208, thereby relatively non-rotatably (i.e., fixedly) coupling the second hub 554 to the first shaft 208. In other words, when the vehicle 100 is produced, the second hub 554 and the first shaft 208 are splined together such that the first shaft 208 and the second hub 554 are rotatable together relative to the first axis 210 in the same direction. In some examples, the second hub 554 is relatively rotatably coupled the housing 211, for example, via a bearing (e.g., a thrust bearing) operatively interposed between the hub 554 and (a) a portion of the cover 202 and/or (b) a portion of the turbine 304.

In some examples, to facilitate supporting the output portion 306 and/or coupling the output portion 306 to the second hub 554, the second hub 554 of FIG. 5 defines an example flange (e.g., radial flange) 556 extending away from the second hub 554 radially outward relative to the first axis 210. As shown in FIG. 5, the flange 556 of the second hub 554 at least partially overlaps with the second end 558 (as represented by the dotted/dashed lines of FIG. 5) of the second body 320. In such examples, the damper assembly 300 of FIG. 5 also includes one or more example fasteners 560 configured to relatively non-rotatably (i.e., fixedly) couple the second body 320 of the output portion 306 and the flange 556 of the second hub 554 together. According to the illustrated example of FIG. 5, the fastener(s) 560, which may be radially distributed relative to the first axis 210, extend at least partially through the second body 320 and the flange 556. Additionally or alternatively, in some examples, the first shell 326 of the turbine 304 is positioned on the flange 556 and relatively non-rotatably (i.e., fixedly) coupled the flange 556, for example, via one or more fasteners and/or one or more fastening methods or techniques. For example, as shown in FIG. 5, the second hub 554 includes one or more holes 562 positioned on the flange 556 and radially distributed relative to the first axis 210, each of which is configured to receive a fastener for coupling the first shell 326 and the flange 556 together.

Additionally, in some examples, the second hub 554 of FIG. 5 is configured to provide radial guidance to one or more components of the torque converter 200 such as, for example, the piston 330. For example, an inner surface (e.g., an inner circumferential surface) of the piston 330 is configured to slidably engage an outer surface (e.g., an outer circumferential surface) of the second hub 554, which substantially maintains a positioned and/or an orientation of the piston 330 relative to the housing 211 of the torque converter 200.

In some examples where the damper assembly 300 is implemented using one or more auxiliary spring members (e.g., see FIG. 7), the output portion 306 includes one or more auxiliary tabs 566, 568, 570 positioned on and/or coupled to the second body 320, three of which are shown in this example (i.e., a first auxiliary tab 566, a second auxiliary tab 568, and a third auxiliary tab 570). As shown in FIG. 5, the auxiliary tabs 566, 568, 570 of the output portion 306 are radially distributed relative to the first axis 210. In particular, each of the auxiliary tabs 566, 568, 570 of FIG. 5 is configured to engage an end of an auxiliary spring and/or an associated seat during damper operation, as will be discussed further below.

Figure 6:
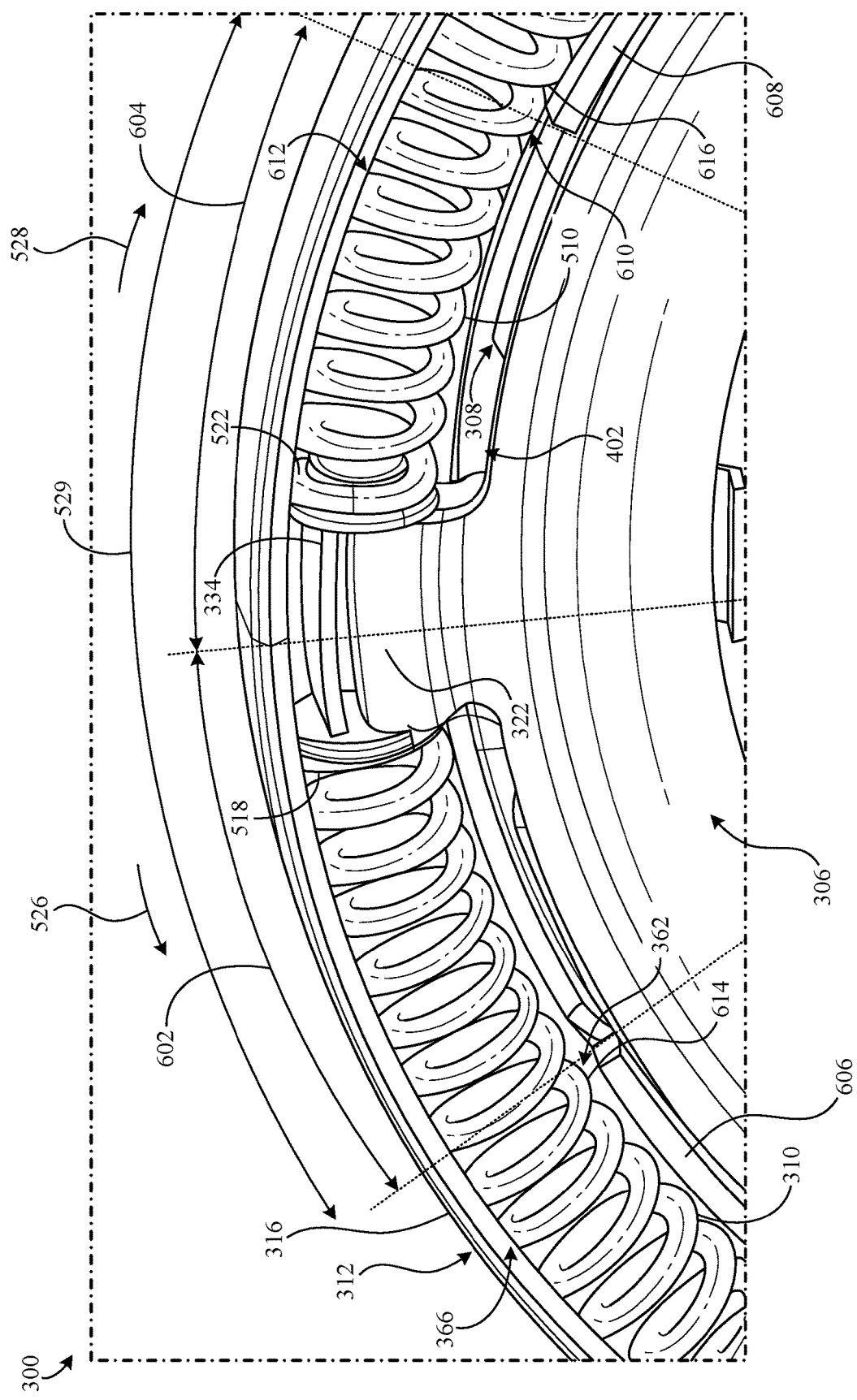
FIG. 6 is an enlarged portion-view of the damper assembly of FIG. 5 and shows an example cutout in accordance with the teachings of this disclosure.

FIG. 6 is an enlarged portion-view of the damper assembly 300 of FIG. 5 and shows the first cutout 402. According to the illustrated example of FIG. 6, a size of the first cutout 402 is limited to ensure sufficient radial guiding of at least some or all of the spring member(s) 310, 510, 540, 542, 544, 546 occurs. In some examples, the first cutout 402 of FIG. 6 is sized and/or shaped such that the output portion 306 and/or the input portion 306 is/are rotatable relative the intermediate portion 312 by half of the first angle of rotation 529 associated with the damper assembly 300, for example, both in a positive and negative rotational directions. In such examples, the first tab 322 of the output portion 306 is rotatable relative to the tabs 512, 514, 553 of the intermediate portion 312 in (a) the first rotational direction 526 across a second example angle of rotation 602 associated with the damper assembly 300 and/or (b) the second rotational direction 528 across a third example angle of rotation 604 associated with the damper assembly 300. As such, the first tab 322 of the output portion 306 is configured to travel across at least a partial length of the first cutout 402 based on relative rotation associated with the output portion 306, the input portion 308, and/or the intermediate portion 312. Similarly, in such examples, the first tab 334 of the input portion 308 is rotatable relative to the tabs 512, 514, 553 of the intermediate portion 312 in (a) the first rotational direction 526 across the second example angle of rotation 602 and/or (b) the second rotational direction 528 across the third example angle of rotation 604. As such, the first tab 334 of the input portion 306 is configured to travel across at least a partial length of the first cutout 402 based on relative rotation associated with the output portion 306, the input portion 308, and/or the intermediate portion 312. The second angle of rotation 602 of FIG. 6 and the third angle of rotation 604 of FIG. 6 form and/or define the first angle of rotation 529 associated with the damper assembly 300. As such, the second angle of rotation 602 and the third angle of rotation 604 are substantially the same or equal, as shown in FIG. 6. Additionally, in some examples, each of the first tabs 322, 334 of the respective output and input portions 306, 308 is configured to repeatedly travel across the entire length of the first cutout 402.

Although FIG. 6 depicts aspects in connection with the first tab 322 of the output portion 308, the first tab 334 of the input portion 308, in some examples, such as aspects likewise apply to one or more other tabs of the respective output and input portions 306, 308. Further, although FIG. 6 depicts aspects in connection with the first cutout 402, in some examples, such aspects likewise apply to one or more other cutouts of the intermediate portion 312. On the other hand, in some examples, the intermediate portion 312 is implemented without the first cutout 402 or any other such cutout, as discussed further below in connection with FIG. 8. In such examples, the first body 316 of the intermediate portion 312 only includes the first cross-sectional area 375 but not the second cross-sectional area 404.

In some examples, to facilitate providing inner radial guidance to the spring member(s) 310, 510, 540, 542, 544, 546, the first portion 370 of the first body 316 includes and/or is defined by multiple segments 606, 608, two of which are shown in this example (i.e., a first segment 606 and a second segment 608). In some such examples, the first segment 606 of FIG. 6 is configured to directly contact and/or slide against at least part of the inner radial portion 362 of the first spring member 310. Similarly, in such examples, the second segment 608 of FIG. 6 is configured to directly contact and/or slide against at least a part of an inner radial portion 610 of the second spring member 510. As shown in FIG. 6, the first cutout 402 is positioned between the first and second segments 606, 608. Further, in some examples, ends of the respective first and second segments 606, 608 at least partially form and/or define the first cutout 402.

On the other hand, in some examples, the third portion 374 of the first body 316 includes and/or is defined by a single, substantially continuous segment, which facilitates providing outer radial guidance to the spring member(s) 310, 510, 540, 542, 544, 546. According to the illustrated example of FIG. 6, the third portion 374 of the first body 316 is configured to directly contact and/or slide against the outer radial portion 366 of the first spring member 310 and an outer radial portion 612 of the second spring member 510. Thus, in some examples, the first body 316 of the intermediate portion 312 is configured to engage (e.g., slidably engage) the inner and outer radial portions 362, 366, 610, 612 of the respective first and second spring members 310, 510. As a result of such engagement associated with the first body 316 of the intermediate portion 312 and the first and second spring members 310, 510, the first body 316 substantially maintains bend radii of the respective first and second spring members 310, 510. In this manner, the first portion 370 of the first body 316 and the third portion 374 of the first body 316 radially guide at least the first and second spring members 310, 510 and, in some examples, one or more (e.g., all) of the other spring member(s) 540, 542, 544, 546 of the damper assembly 300.

As previously mentioned, the size of the first cutout 402 is limited. In particular, in some examples, when the first spring member 310 is in the first spring state, more than half of a length (e.g., an uncompressed length) of the first spring member 310 is radially guided by the first segment 606. Additionally or alternatively, in some examples, when the second spring member 510 is in the first spring state, more than half of a length (i.e., an uncompressed length) of the second spring member 510 is radially guided by the second segment 608. Stated differently, in some examples, more than half of an uncompressed length of the first or second spring member 310, 510 is radially guided by the first portion 370 of the first body 316. In such examples, when the first and second spring members 310, 510 are installed on the damper assembly 300, the first portion 370 of the first body 316 engages central areas or centers of the respective first and second spring members 310, 510. For example, the first segment 606 of FIG. 6 is configured to impart a force on a first central area or center 614 of the first spring member 310. Further, the second segment 608 of FIG. 6 is configured to impart a force on a second central area or center 616 of the second spring member 510. Additionally, in such examples, the third portion 374 of the first body 316 engages the ends 518, 520, 522, 524 of the respective first and second spring members 310, 510.

Although FIG. 6 depicts aspects in connection with the first and second spring members 310, 510, in some examples, such aspects likewise apply to one or more other spring members of the damper assembly 300 such as, for example, any one or more (e.g., all) of the third spring member 540, the fourth spring member 542, the fifth spring member 544, and/or the sixth spring member 546.

Figure 7:
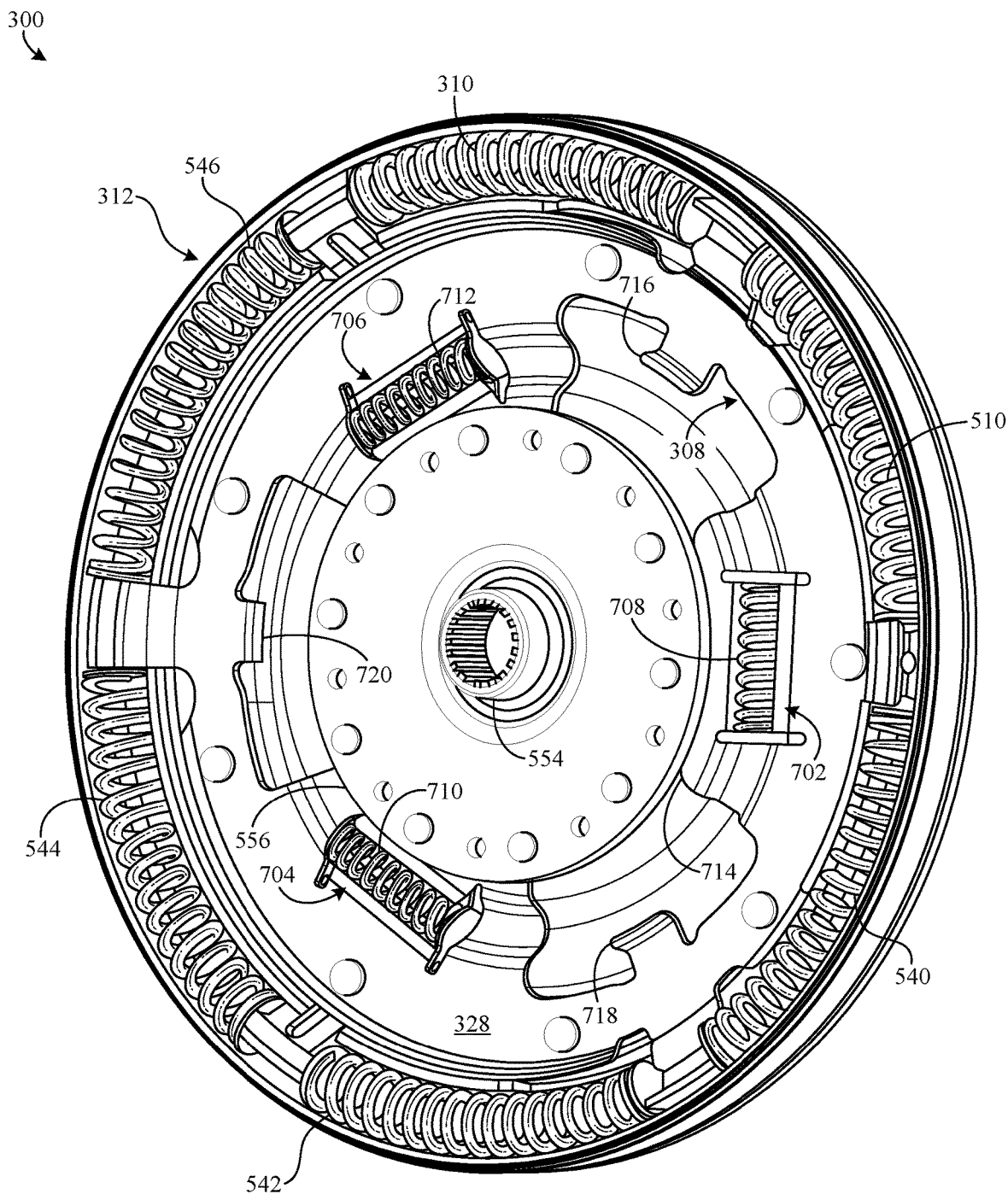
FIG. 7 is another detailed view of an example damper assembly in accordance with the teachings of this disclosure.

FIG. 7 is another detailed view of the damper assembly 300 of FIGS. 3 and 4. According to the illustrated example of FIG. 7, the output portion 306 has been removed from the damper assembly 300, for clarity. In some examples, to accommodate one or more auxiliary spring members (e.g., relatively small compression springs), the damper assembly 300 of FIG. 7 includes one or more auxiliary cavities (e.g., spring cavities) 702, 704, 706 that may be radially distributed relative to the first axis 210, three of which are shown in this example (i.e., a first auxiliary cavity 702, a second auxiliary cavity 704, and a third auxiliary cavity 706). In such examples, each of the auxiliary cavities 702, 704, 706 is formed and/or define by any of (a) the output portion 306, (b) the input portion 308, (c) the intermediate portion 312, (d) the piston 330, or (e) a combination thereof (e.g., some or all of (a), (b), (c), and/or (d)). In such examples, to further improve damper performance, the damper assembly 300 of FIG. 7 includes one or more auxiliary spring members (e.g., relatively small compression springs) 708, 710, 712, three of which are shown in this example (i.e., a first auxiliary spring member 708, a second auxiliary spring member 710, and a third auxiliary spring member 712). Each of the auxiliary spring members 708, 710, 712 is disposed in a respective one of the auxiliary cavities 702, 704, 706. Additionally, each of the auxiliary spring members 708, 710, 712 of FIG. 7 may be provided with a pair of spring seats configured to engage part of the input portion 308 and part of the output portion 306 during damper operation. In particular, when the output and input portions 306, 308 rotate relative to each other, the auxiliary tabs 566, 568, 570 are configured to compress and/or decompress respective ones of the auxiliary spring members 708, 710, 712.

As shown in FIG. 7, the primary spring members 310, 510, 540, 542, 544, 546 are positioned radially outward relative to the auxiliary spring members 708, 710, 712. In other words, the auxiliary spring members 708, 710, 712 of FIG. 7 are positioned radially inward relative to the primary spring members 310, 510, 540, 542, 544, 546. In some examples, when the intermediate portion 312 is rotating, the primary spring members 310, 510, 540, 542, 544, 546 have the same pitch circle diameter (PCD). Similarly, in some such examples, the auxiliary spring members 708, 710, 712 have the same PCD.

According to the illustrated example of FIG. 7, the third body 328 of the input portion 308 has the second end 714 positioned adjacent the flange 556 of the second hub 554. In some examples, the second end 714 of the third body 328 is configured to engage (e.g., slidably engage) an outer surface (e.g., an outer circumferential surface) of the flange 556, thereby providing radial guidance to the input portion 308 during damper operation. Additionally, in some examples, to provide radial guidance to the output portion 306, the input portion 308 of FIG. 7 includes one or more auxiliary tabs (e.g., guide tabs) 716, 718, 720 positioned on and/or coupled to the third body 328, three of which are shown in this example. In particular, the auxiliary tabs 716, 718, 720 of the input portion 308 are configure to engage (e.g., slidably engage) an inner surface (e.g., an inner circumferential surface) of the second body 320, thereby substantially maintaining a relative position and/or orientation of the output portion 306 during damper operation.

Figure 8:
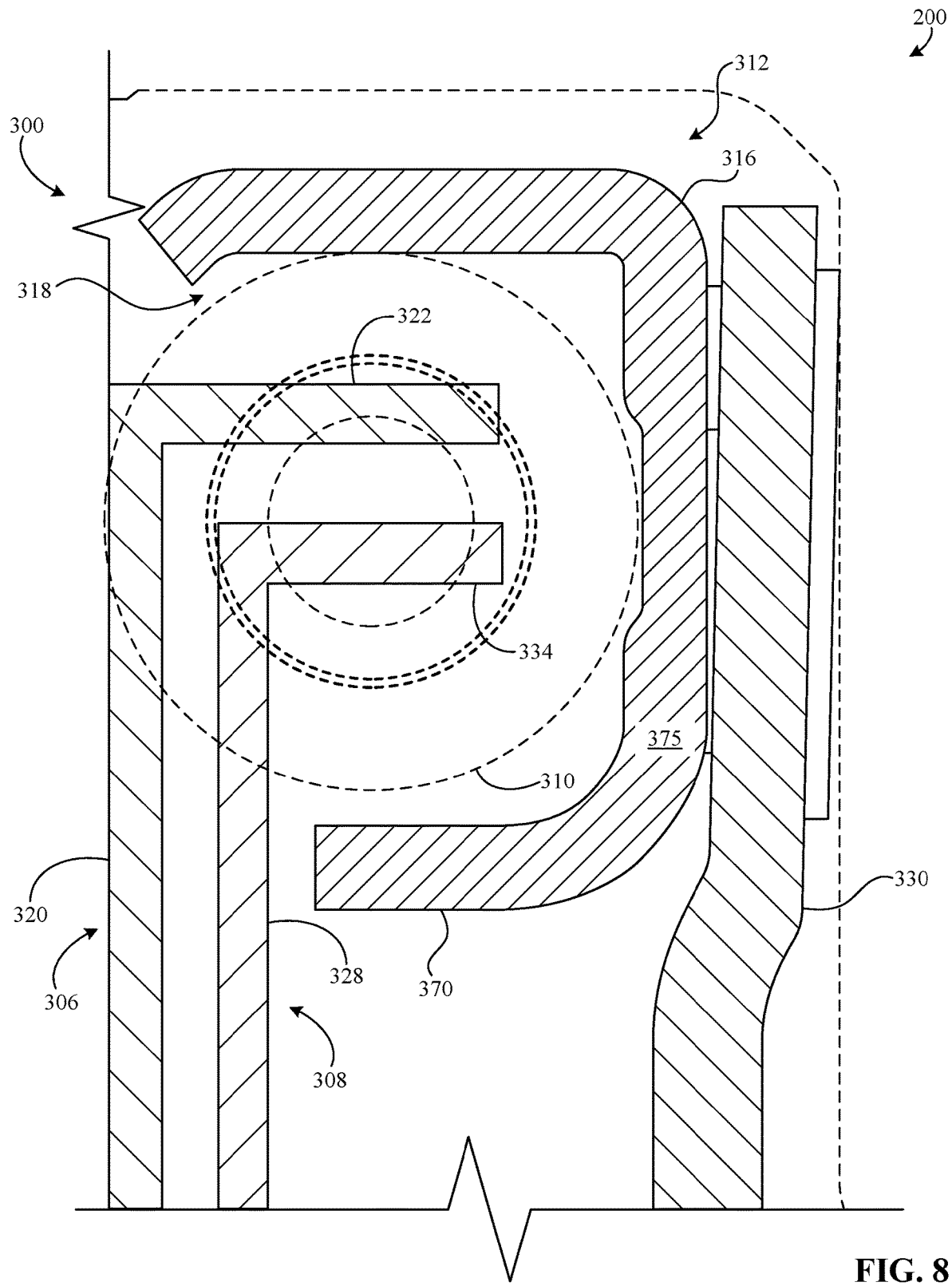
FIG. 8 is another partial cross-sectional view of the example torque converter of FIG. 2 along line B-B and shows a different configuration of an example damper assembly in accordance with the teachings of this disclosure.

FIG. 8 is another partial cross-sectional view of the torque converter 200 of FIG. 2 along line B-B and shows a different configuration of the damper assembly 300 in accordance with the teachings of this disclosure. According to the illustrated example of FIG. 8, the intermediate portion 312 is slidably interposed between the piston 330 and the input portion 308, similar to the illustrated examples of FIGS. 3 and 4. In particular, the intermediate portion 312 of FIG. 8 does not include any cutouts positioned on the first body 316 or the first portion 370 thereof. As a result, inner radially guiding of the spring member(s) 310, 510, 540, 542, 544, 546 occurs over an entire circumference of the first portion 370 of the first body 316. Further, unlike the illustrated example of FIGS. 3 and 4, the second body 320 is sized, shaped, structured, and/or otherwise configured such that each of the tab(s) 322, 532, 534 of the output portion 306 of FIG. 8 extends at least partially through or into the open side of the first cross-sectional area 375. For example, as shown in FIG. 8, the first tab 322 of the output portion 306 enters the first cavity 314 via the first opening 318 on the first body 316. Additionally, in such examples, the third body 328 is sized, shaped, structured, and/or otherwise configured such that each of the tabs 334, 536, 538 of the input portion 308 similarly extends at least partially through or into the open side of the first cross-sectional area 375. For example, as shown in FIG. 8, the first tab 334 of the input portion 308 enters the first cavity 314 via the first opening 318 on the first body 316.

Figure 9:
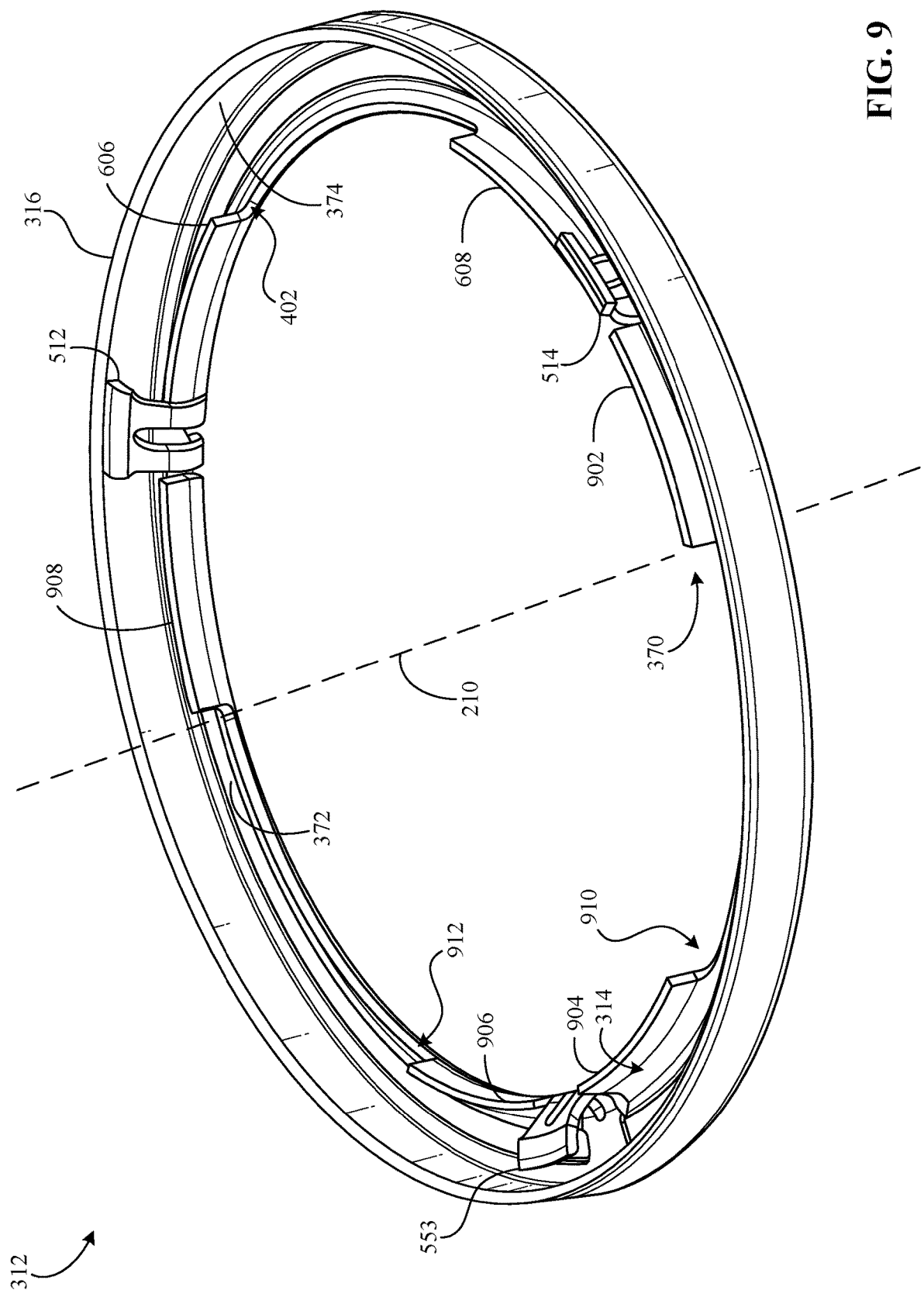
FIG. 9 is a detailed view of an example intermediate portion in accordance with the teachings of this disclosure.

FIG. 9 is a detailed view of the intermediate portion 312. According to the illustrated example of FIG. 9, the third portion 374 of the first body 316 is continuous. Similarly, the second portion 372 of the first body 316 of FIG. 9 is continuous. For example, each of the second and third portions 372, 374 of the first body 316 extend entirely around the first axis 210, as shown in FIG. 9. On the other hand, the first portion 370 of the first body 316 of FIG. 9 is discontinuous. In some examples, the first portion 370 of the first body 316 is a single portion that extends only partially around first axis 210 to form an arc. However, as previously mentioned, the first portion 370 may include and/or be defined by multiple segments 606, 608, 902, 904, 906, 908, six of which are shown in this example (i.e., the first segment 606, the second segment 608, a third segment 902, a fourth segment 904, a fifth segment 906, and a sixth segment 908). The segments 606, 608, 902, 904, 906, 908 of FIG. 9 are radially distributed relative to the first axis 210. In some examples, the segments 606, 608, 902, 904, 906, 908 are substantially the same size and/or shape relative to each other. Additionally, in some examples, one or more (e.g., all) of the segments 606, 608, 902, 904, 906, 908 is/are arc-shaped. As shown in FIG. 9, each of the segments 606, 608, 902, 904, 906, 908 extends only partially around the first axis 210 to form and/or define an arc. In particular, the segments 606, 608, 902, 904, 906, 908 of first portion 370 of the first body 316 are configured to provide inner radial guidance to respective ones of the spring members 310, 510, 540, 542, 544, 546 of the damper assembly 300. For example, the first segment 606 is configured to provide inner radial guidance to the first spring member 310, the second segment 608 is configured to provide inner radial guidance to the second spring member 510, the third segment 902 is configured to provide inner radial guidance to the third spring 540, etc. On the other hand, the third portion 374 of the first body 316 is configured to provide outer radial guidance to one or more (e.g., all) of the spring member(s) 310, 510, 540, 542, 544, 546.

Additionally, in some examples, to allow sufficient angular freedom of the output portion 306 and/or the input portion 308, the intermediate portion 312 of FIG. 9 includes multiple cutouts 402, 910, 912 positioned on the first body 316, three of which are shown in this example (i.e., the first cutout 402, a second cutout 910, and a third cutout 912). In such examples, each of the cutouts 402, 910, 912 of the intermediate portion 312 is positioned between adjacent pairs of the segments 606, 608, 902, 904, 906, 908. The cutouts 402, 910, 912 of FIG. 9 are radially distributed relative to the first axis 210. In some examples, the cutouts 402, 910, 912 are substantially the same size and/or shape relative to each other, as shown in FIG. 9. Each of the cutouts 402, 910, 912 is configured to receive a single tab 322, 532, 534 of the output portion and a single tab 334, 536, 538 of the input portion 308, both of which occupy a central location of the cutout 402, 910, 912 when the damper assembly 300 is substantially in an equilibrium state.

Although FIG. 9 depicts the intermediate portion 312 having the multiple cutouts 402, 910, 912, in some examples, the intermediate portion 312 is implemented without any of the cutouts 402, 910, 912, as previously mentioned. In such examples, the first portion 370 of the first body 316 is substantially continuous.

Figure 10:
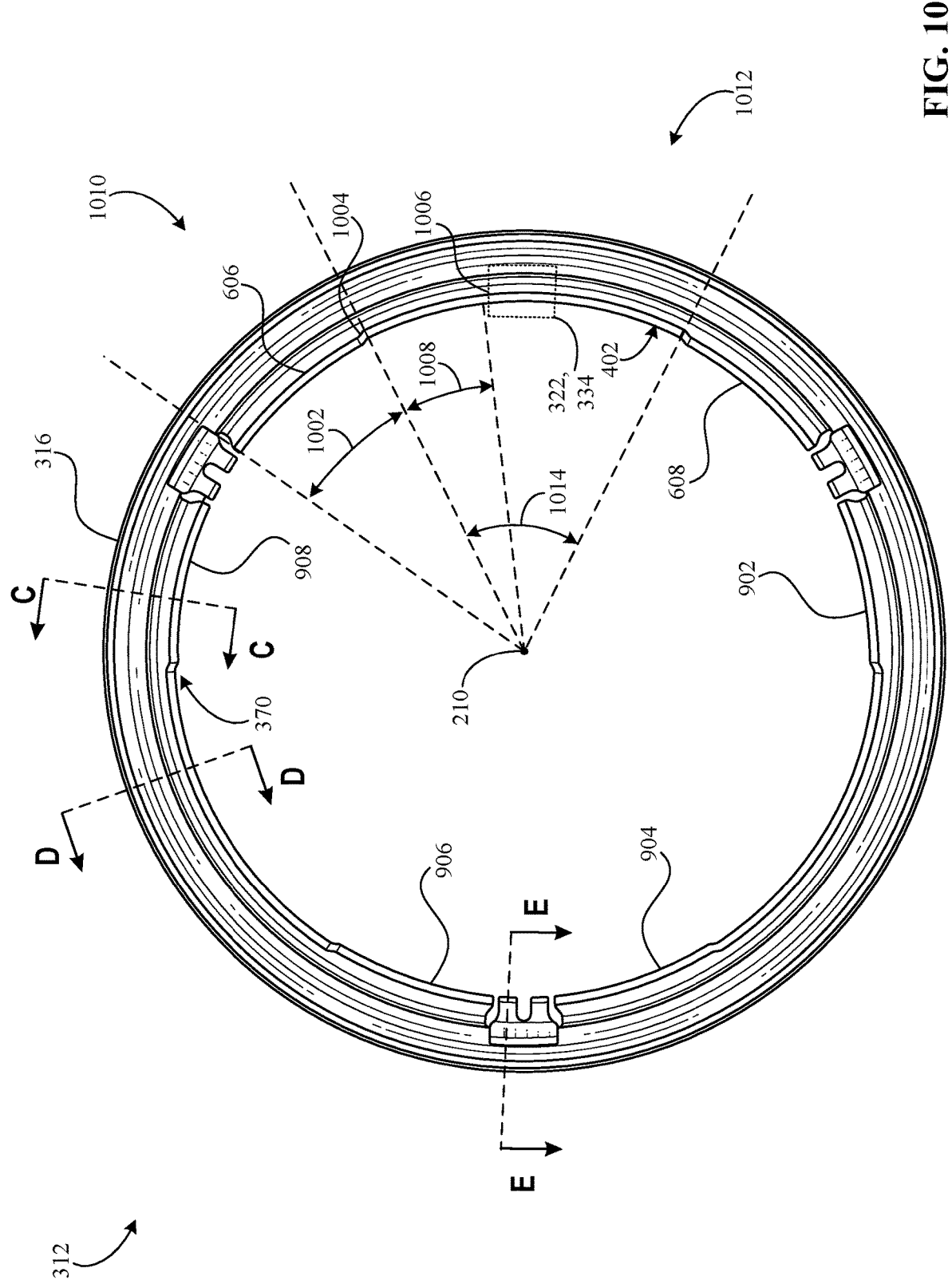
FIG. 10 is another detailed view of the example intermediate portion of FIG. 9.

As shown in FIG. 9, the first cavity 314 of FIG. 9 is substantially continuous, for example, due to shapes of the respective tabs 512, 514, 553 of the intermediate portion 312. However, in some examples, the first cavity 314 is discontinuous. In such examples, each of the tabs 512, 514, 553 of the intermediate portion 312 separate the first cavity 314 into separate portions or cavities. Further, in such examples, the first cavity 314 extends only partially around the first axis 210 such that the first cavity 314 is substantially arc-shaped FIG. 10 is another detailed view of the intermediate portion 312. According to the illustrated example of FIG. 10, the first segment 606 of the first portion 370 of the first body 316 extends along a substantially circular path across a first angle (e.g., in degrees) 1002 relative to the first axis 210. Further, an end 1004 of the first segment 606 and an end 1006 the first tab 322, 334 of the output or input portion 306, 308 form and/or define a second angle (e.g., in degrees) 1008 relative to the first axis 210 that is smaller than the first angle 1002 of FIG. 10. In some examples, the first angle 1002 of FIG. 10 corresponds to a value that is substantially 27.007 degrees or more. Additionally, in some examples, the second angle 1004 of FIG. 10 corresponds to a value that is substantially 22.355 degrees or less. As shown in FIG. 10, the end 1004 of the first segment 606 and the end 1006 of the first tab 322, 334 of the output or input portion 306, 308 face each other. Further, the first tab 322, 334 of the output or input portion 306, 308 is centrally positioned in the first cutout 402. In some examples, both the first tab 322 of the output portion 306 and the first tab 334 of the input portion 308 are centrally positioned in the first cutout 402.

Although FIG. 10 depicts aspects in connection with the first segment 606 and the first tab 322, 334 of the output or input portion 306, 308, in some examples, such aspects likewise apply to one or more (e.g., all) of the other segments 608, 902, 904, 906, 908 and/or one or more (e.g., all) of the other tabs 532, 534, 536, 538 of the output or input portions 306, 308.

According to the illustrated example of FIG. 10, the first angle 1002 corresponds to a primary sector 1010 of the intermediate portion 312. In some examples, the primary sector 1010 of FIG. 10 includes the first cross-sectional area 375 of the first body 316. That is, in such examples, the first cross-sectional area 375 of the first body 316 is positioned in the primary sector 1010 of the intermediate portion 312. For example, the first cross-sectional area 375 is substantially uniform across a length of the primary sector 1010. Further, in some examples where at least part of the intermediate portion 312 is implemented using the second cross-sectional area 404, the intermediate portion 312 of FIG. 10 also includes at least a secondary sector 1012 positioned adjacent the primary sector 1010. The secondary sector 1012 of the intermediate portion 312 corresponds to a third angle 1014 that is different (e.g., larger) relative to the first angle 1002. In such examples, the secondary sector 1012 of FIG. 10 includes the second cross-sectional area 404 of the first body 316. That is, in such examples, the second cross-sectional area 404 of the first body 316 is positioned in the secondary sector 1012. For example, the second cross-sectional area 404 is substantially uniform across a length of the secondary sector 1012. Further, in some examples, the intermediate portion 312 is provided with multiple primary sectors 1010 and secondary sectors 1012, as shown in FIG. 10.

Figure 11:
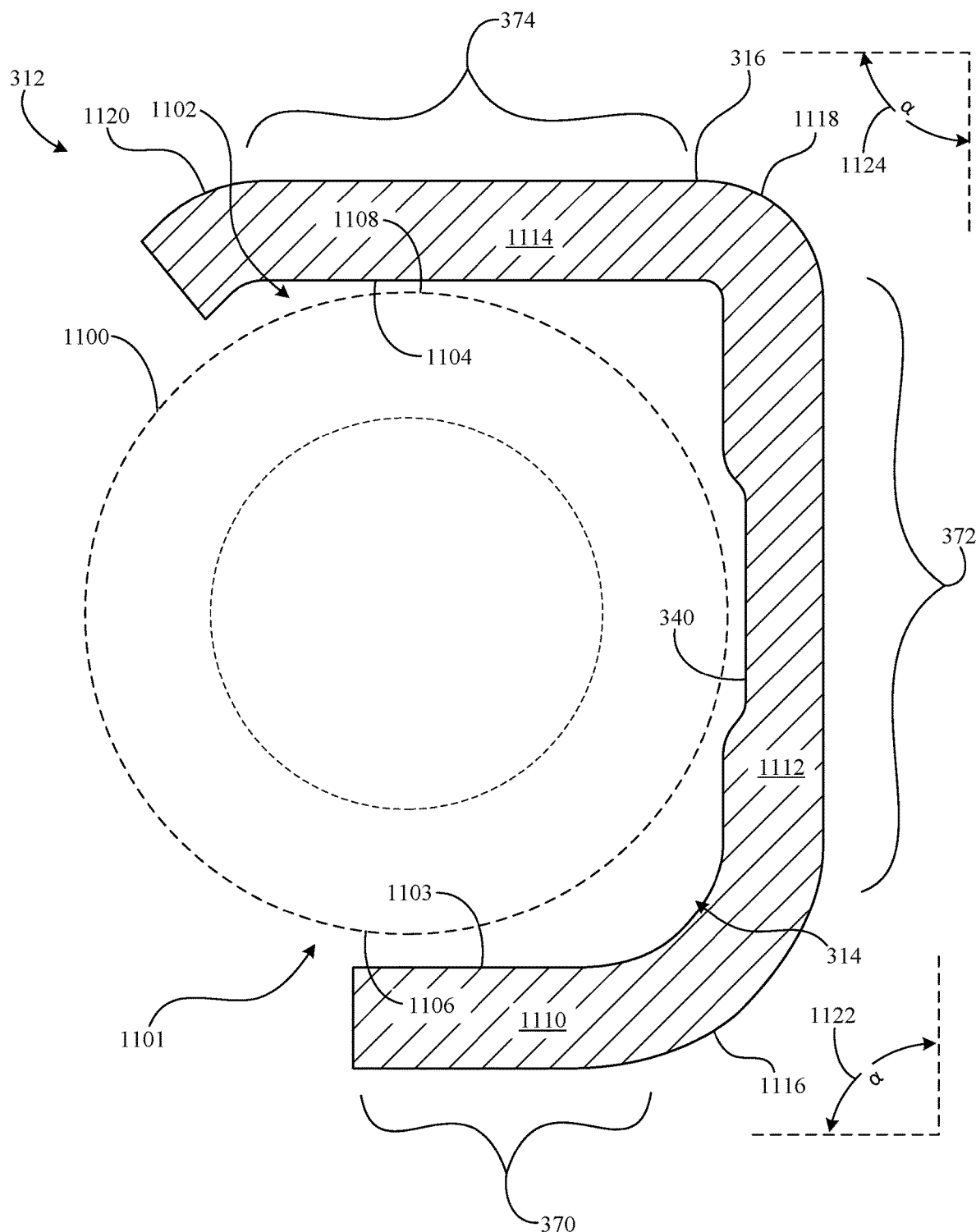
FIG. 11 is a cross-sectional view of the example intermediate portion of FIG. 10 along line C-C and shows an example spring member.

FIG. 11 is a cross-sectional view of the intermediate portion 312 of FIG. 10 along line C-C and shows a seventh example spring member (e.g., a compression spring) 1100 in accordance with the teachings of this disclosure. In some examples, the seventh spring 1100 of FIG. 11 corresponds to one or more spring members of the damper assembly 300 such as, for example, any one or more (e.g., all) of the first spring member 310, the second spring member 510, the third spring member 540, the fourth spring member 542, the fifth spring member 544, and/or the sixth spring member 546. Thus, aspects depicted in connection with the seventh spring member 1100 likewise apply to the other spring member(s) 310, 510, 540, 542, 544, 546 of the damper assembly 300. For example, the seventh spring member 1100 of FIG. 11 has an inner radial portion 1101 and an outer radial portion 1102 positioned radially outward relative to the inner radial portion 1101. In particular, the first and third portions 370, 374 of the first body 316 are configured to radially guide the seventh spring member 1100. In some examples, the first portion 370 of the first body 316 is configured to provide inner radial guidance to the seventh spring member 1100, and the third portion 374 of the first body 316 is configured to provide outer radial guidance to the seventh spring 1100.

In some examples, to facilitate providing the radial guidance, the intermediate portion 312 of FIG. 11 includes a third example guide surface (e.g., an outer circumferential surface) 1103 positioned on the first body 316 and a fourth example guide surface (e.g., an inner circumferential surface) 1104 positioned on the first body 316 facing the third guide surface 1103. The third guide surface 1103 and the fourth guide surface 1104 are configured to axially extend through the housing 211 of the torque converter 200 in a substantially horizontal direction. As shown in FIG. 11, the third guide surface 1103 is defined by the first portion 370 of the first body 316, and the fourth guide surface 1104 is defined by the third portion 374 of the first body 316. Further, the third guide surface 1103 of the intermediate portion 312 is positioned proximate to an inner surface (e.g., an inner diameter surface) 1106 of the seventh spring member 1100 corresponding to the inner radial portion 1101 of the seventh spring member 1100. On the other hand, the fourth guide surface 1104 is positioned proximate to an outer surface (e.g., an outer diameter surface) 1108 of the seventh spring member 1100 corresponding to the outer radial portion 1102 of the seventh spring member 1100. In particular, the third guide surface 1103 is configured to engage (e.g., slidably engage) at least part of the inner surface 1106 of the seventh spring member 1100, and the fourth guide surface 1104 is configured to engage (e.g., slidably engage) at least part of the outer surface 1108 of the seventh spring member 1100. In this manner, the first body 316 of the intermediate portion is configured to provide inner and outer radial guidance to the seventh spring member 1100 and/or maintain a suitable bend radius of the seventh spring member 1100.

According to the illustrated example of FIG. 11, the first portion 370 of the first body 316 is a first wall (e.g., a circumferential wall) 1110 corresponding to the third guide surface 1103 of the intermediate portion 312. Further, the second portion 372 of the first body 316 is a second wall (e.g., an annular wall) 1112 corresponding to the first guide surface 340 of the intermediate portion 312. Further still, the third portion 374 of the first body 316 is a third wall (e.g., a circumferential wall) 1114 corresponding to the fourth guide surface 1114 of the intermediate portion 312. In some examples, the first and third portions 370, 374 of the first body 316 are substantially concentric and spaced from each other by a radial distance. As shown in FIG. 11, the first wall 1110 of FIG. 11 is positioned radially inward relative to the third wall 1114. In other words, the third wall 1114 of FIG. 11 is positioned radially outward relative to the first wall 1110. Further, the second wall 1112 of FIG. 11 is interposed between the first and third walls 1110, 1114 and couples the first and third walls 1110, 1114 together. As shown in FIG. 11, the second wall 1112 extends from the first walls 1110 to the third wall 1114.

In some examples, the intermediate portion 312 of FIG. 11 includes one or more preformed curvatures or bends 1116, 1118, 1120, which improve strength and/or rigidity of the intermediate portion 312. Three of the preformed bend(s) 1116, 1118, 1120 are shown in the illustrated example of FIG. 11 (i.e., a first bend 1116, a second bend 1118, and a third bend 1120). The bend(s) 1116, 1118, 1120 of the first body 316 can be produced, for example, via one or more manufacturing processes and/or metal forming processes such as bending. As shown in FIG. 11, each of the first bend 1116, the second bend 1118, and the third bend 1120 is positioned on the first body 316. In such examples, the first portion 370 of the first body 316 and the second portion 372 of the first body 316, together, at least partially form and/or define the first bend 1116 of the intermediate portion 312. That is, the first bend 1116 of FIG. 11 is an interface between the first and second portions 370, 372 of the first body 316. As a result of forming the first bend 1116 of the intermediate portion 312, the first and second portions 370, 372 of the first body 316 are positioned and/or oriented relative to each to such that a fourth angle 1122 is defined by the first and second portions 370, 372 of the first body 316. In other words, the first portion 370 of the first body 316 is angled relative to the second portion 372 of the first body 316. For example, the fourth angle 1122 of FIG. 11 is substantially 90 degrees.

Further, in such examples, the second portion 372 of the first body 316 and the third portion 374 of the first body 316, together, at least partially form and/or define the second bend 1118 of the intermediate portion 312. That is, the second bend 1118 of FIG. 11 is an interface between the second and third portions 372, 374 of the first body 316. In such examples, as a result of forming the second bend 1118 of the intermediate portion 312, the second and third portions 372, 374 of the first body 316 are positioned and/or oriented relative to each other to such that a fifth angle 1124 is substantially defined by the second and third portions 372, 374 of the first body 316. In other words, the second portion 372 of the first body 316 is angled relative to the third portion 374 of the first body 316. For example, the fifth angle 1124 of FIG. 11 is substantially 90 degrees. Accordingly, in some examples, the fourth angle 1122 and the fifth angle 1124 are substantially equal or the same, as shown in FIG. 11. According to the illustrated example of FIG. 11, all of the first portion 370 of the first body 316, the second portion 372 of the first body 316, and the third portion 374 of the first body 316 form and/or define the first cavity 314 in which the seventh spring member 1100 is positioned.

Figure 12:
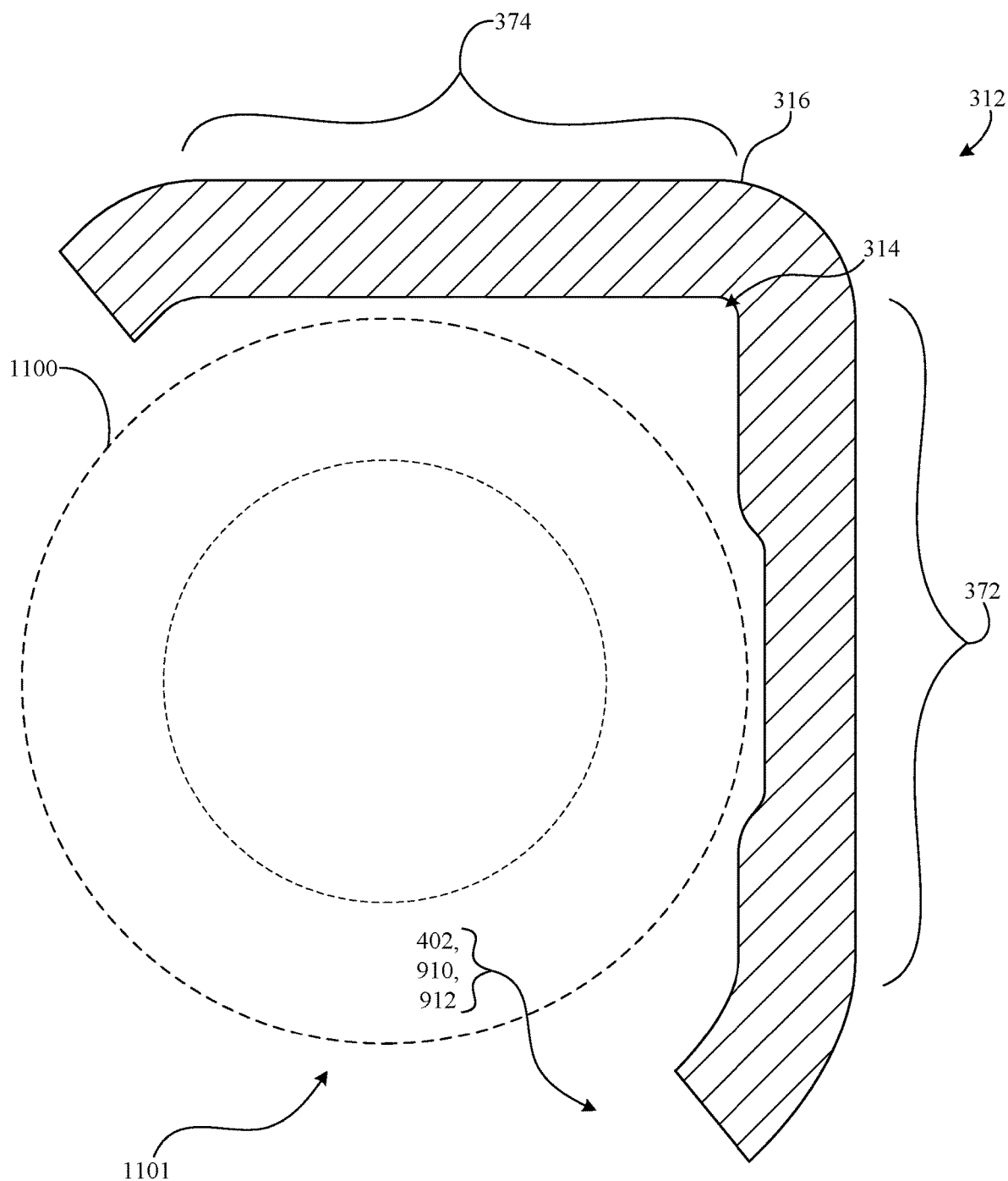
FIG. 12 is another cross-sectional view of the example intermediate portion of FIG. 10 along line D-D.

FIG. 12 is another cross-sectional view of the intermediate portion 312 of FIG. 10 along line D-D and shows the seventh spring member 1100. According to the illustrated example of FIG. 12, only the second portion 372 of the first body 316 and the third portion 374 of the first body 316 form and/or define the first cavity 314 in which the seventh spring member 1100 is positioned. As such, the intermediate portion 312 of FIG. 12 includes at least one of the cutouts 402, 910, 912, which is positioned on the first body 316 and at least partially exposes the inner radial portion 1101 of the seventh spring member 1100.

Figure 13:
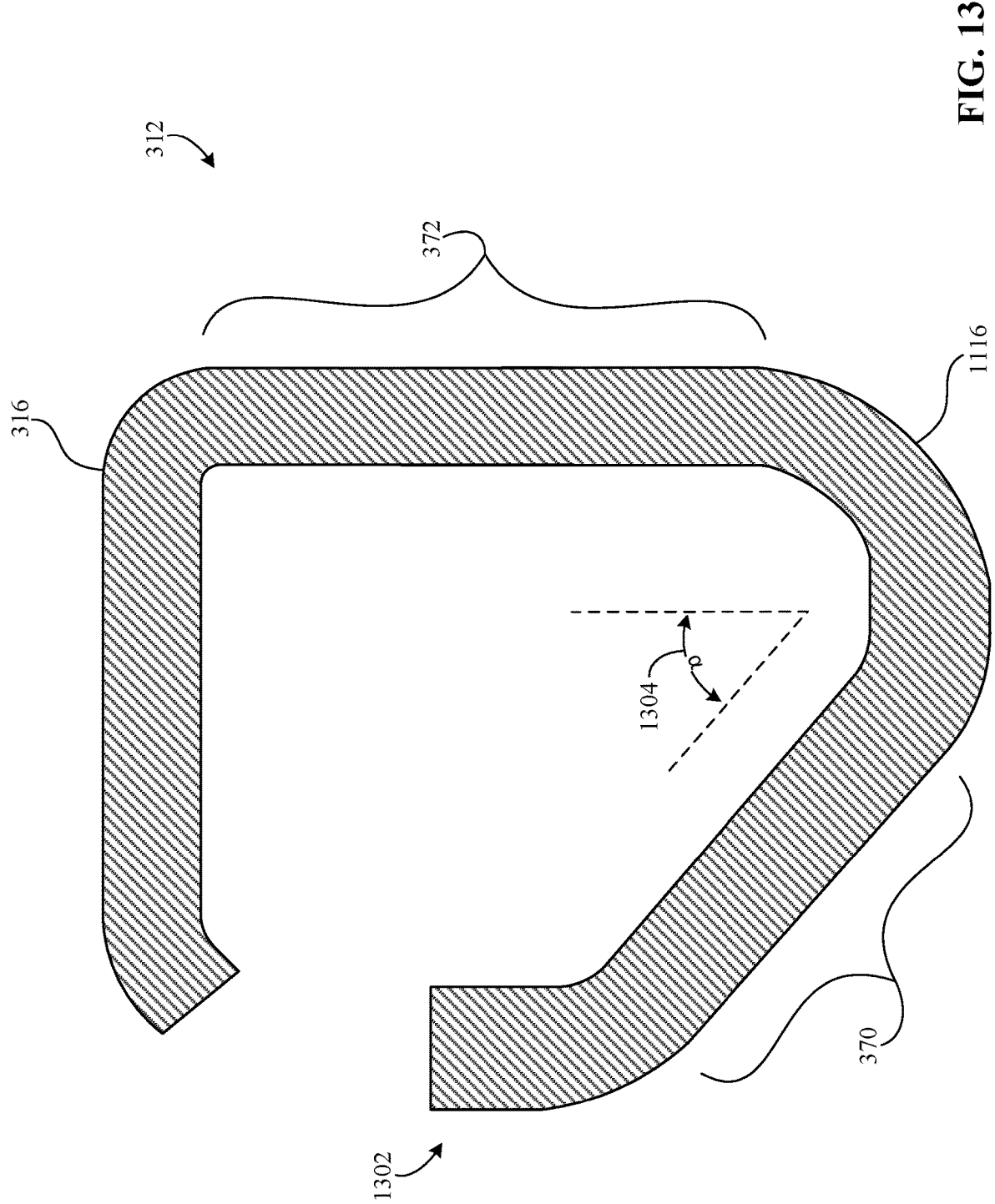
FIG. 13 is another cross-sectional view of the example intermediate portion of FIG. 10 along line E-E.

FIG. 13 is another cross-sectional view of the intermediate portion 312 of FIG. 10 along line E-E and shows a fourth example tab (e.g., a fourth transfer tab) 1302 of the intermediate portion 312. In some examples, the fourth tab 1302 of FIG. 13 corresponds to one or more other tabs of the intermediate portion 312 such as, for example, one or more (e.g., all) of the first tab 512, the second tab 514, and/or the third tab 553. For example, the fourth tab 1302 is configured to operatively couple between an adjacent pair of the spring members 310, 510, 540, 542, 544, 546 of the damper assembly 300. According to the illustrated example of FIG. 13, the fourth tab 1302 of the intermediate portion 312 is substantially formed and/or defined by the first portion 370 of the first body 316. In some examples, at least a portion of the first bend 1116 is sized and/or shaped such that a third angle (e.g., in degrees) 1304 is formed and/or defined by the first portion 370 of the first body 316 and the second portion 372 of the first body 316. In such examples, the third angle 1304 of FIG. 13 is smaller than the fourth angle 1122 and/or the fifth angle 1124.

Figure 14:
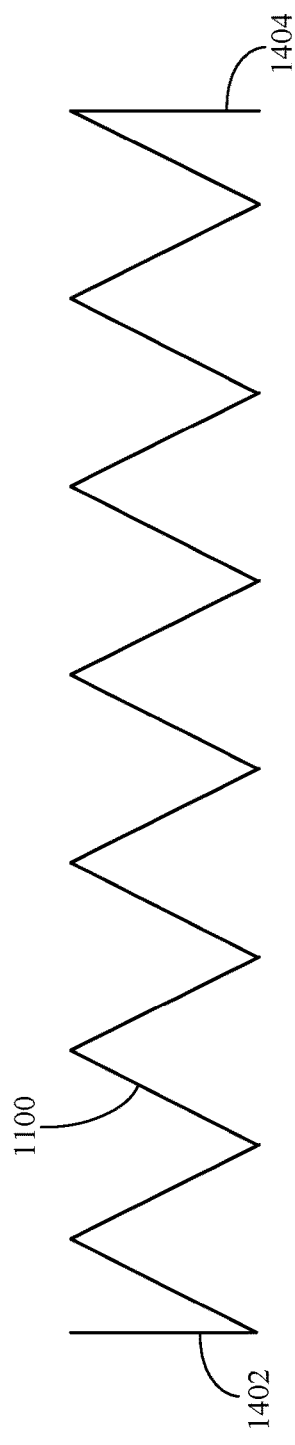
FIG. 14 is a view of the example spring member of FIG. 11 and shows an example spring state associated therewith.

FIG. 14 is a view of the seventh spring member 1100 of FIG. 11 and shows a third example spring state (e.g., an unbent state) associated with the seventh spring member 1100. According to the illustrated example of FIG. 14, when the seventh spring member 1100 is in the third spring state, the seventh spring member 1100 is substantially straight and/or extends along a substantially linear path from a first end 1402 of the seventh spring member 1100 to a second end 1404 of the seventh spring member 1100 opposite the first end 1402. In particular, the seventh spring member 1100 and/or one or more (e.g., all) of the other spring member(s) 310, 510, 540, 542, 544, 546 of the damper assembly 300 is/are in the third spring state prior to assembly of the vehicle torque converter 200.

Figure 15:
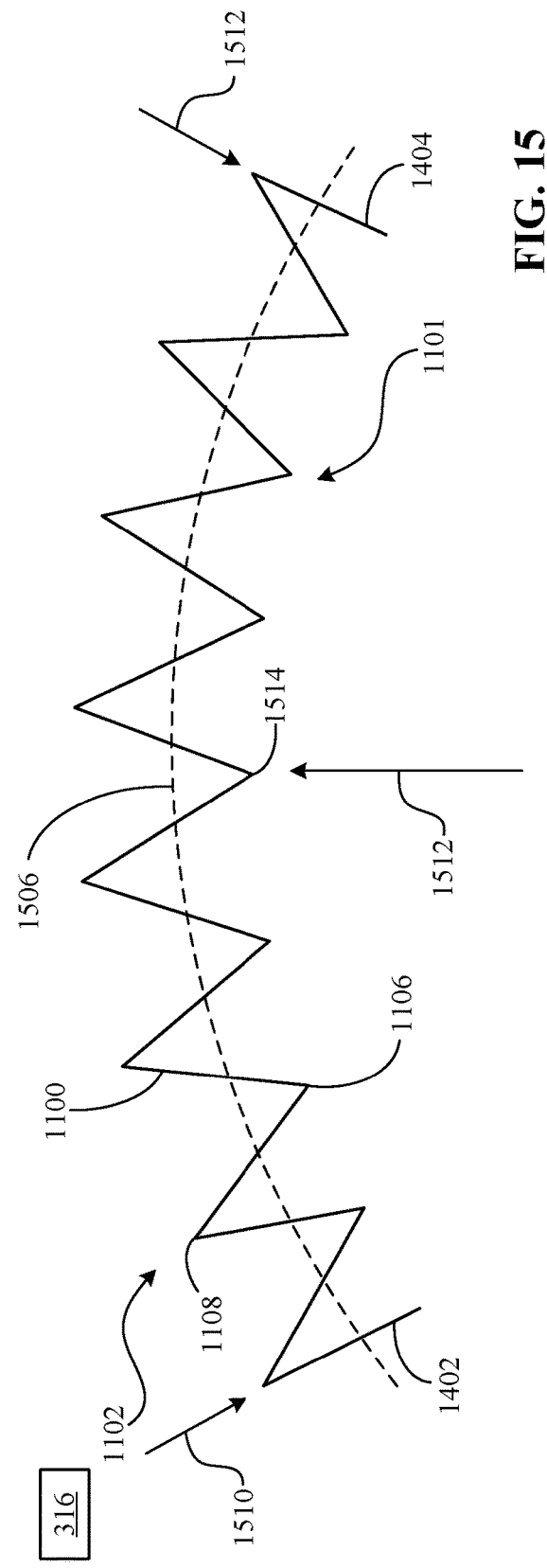
FIG. 15 is another view of the example spring member of FIG. 11 and shows a different example spring state associated therewith.

FIG. 15 is another view of the seventh spring member 1100 of FIG. 11 and shows a fourth example spring state (e.g., a bent state) associated with the seventh spring member 1100. According to the illustrated example of FIG. 15, when the seventh spring member 1100 is in the fourth spring state, the seventh spring member 1100 is substantially bent and/or extends along a substantially curved path from the first end 1402 of the seventh spring member 1100 to the second end 1404 of the seventh spring member 1100. In some examples, the seventh spring member 1100 and/or any one or more (e.g., all) of the other spring member(s) 310, 510, 540, 542, 544, 546 of the damper assembly 300 is/are in the fourth spring state when the vehicle torque converter 200 is assembled.

As shown in FIG. 15, the seventh spring member 1100 has a bend radius 1506, which corresponds to and/or matches at least a shape or geometry of the first cavity 314. To provide the bend radius 1506 of the seventh spring member 1100, the first body 316 or the third portion 374 thereof is configured to generate a first load 1510 and/or impart the first load 1510 on the seventh spring member 1100 on the outer radial portion 1102 of the seventh spring member 1100. In some examples, the first body 316 or the third portion 374 thereof applies the first load 1510 to at least part of the outer surface 1108 of the seventh spring member 1100 at or proximate to the first end 1402 of the seventh spring member 1100. Further, the first body 316 or the third portion 374 thereof is also configured to generate a second load (e.g., substantially equal to the first load 1510) 1512 and/or impart the second load on the outer radial portion 1102 of the seventh spring member 1100. In some examples, the first body 316 or the third portion 374 thereof applies the second load 1512 to the inner surface 1106 of the seventh spring member 1100 at or proximate to the second end 1404 of the seventh spring member 1100. Additionally, to counteract the first and second loads 1502, 1504 and effectively maintain the bend radius 1506, the first body 316 or the first portion 370 thereof is configured to generate a third load (e.g., substantially larger than the first or second load 1510, 1512) 1518 and/or impart the third load 1518 on the inner radial portion 1102 seventh spring member 1100. In some examples, the first body 316 or the first portion 370 thereof applies the third load 1518 in an area (e.g., a center or central area) 1514 of the seventh spring member 1100 that is between the first and second ends 1402, 1404 of the seventh spring member 1100.

As such, in some examples, the first body 316 of the intermediate portion 312 is configured to impart any one or more (e.g., all) of the first load 1506, the second load 1508, and/or the third load 1510 on the seventh spring member 1100. In such examples, the first body 316 is configured to engage (e.g., slidably engage) the inner and outer radial portions 1101, 1102 of the seventh spring member 1100 to maintain the bend radius 1506 of the seventh spring member 1100.

Figure 16:
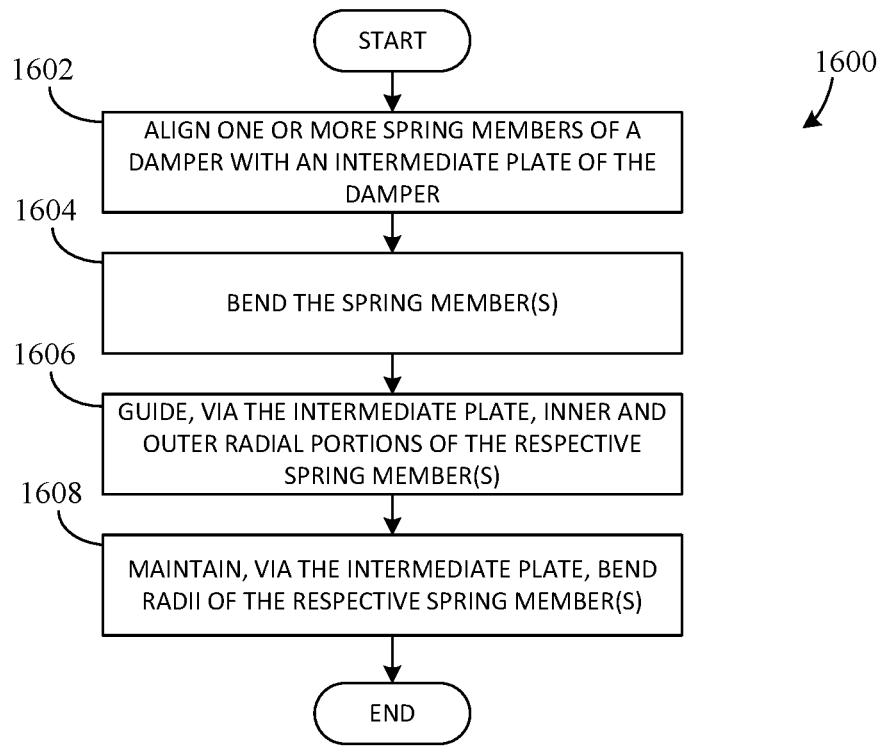
FIG. 16 is a flowchart representative of an example method that can be executed to implement one or more example damper assemblies in accordance with teachings of this disclosure.

FIG. 16 is a flowchart representative of an example method 1600 that can be executed to implement the example damper assembly 300 of FIGS. 3, 4, 5, 6, 7, 8, and/or 9. The example method 1600 of FIG. 6 can be implemented in any of the vehicle 100 of FIG. 1 and/or the vehicle torque converter 200 of FIGS. 2, 3, 4, and/or 9. In particular, the example method 1600 of FIG. 16 is effective in installing (e.g., manually) one or more spring members on a damper of a vehicle torque converter.

The example method 1600 of FIG. 16 begins by aligning one or more spring members of a damper with an intermediate plate of the damper (block 1602). In some examples, one or more (e.g., all) of the first spring member 310, the second spring member 510, the third spring member 540, the fourth spring member 542, the fifth spring member 544, and/or the sixth spring member 546 of the damper assembly 300 is/are aligned with the intermediate portion 312 of the damper assembly 300. In some examples, each of the spring member(s) 310, 510, 540, 542, 544, 546 of the damper assembly 300 is positioned proximate to and/or at least partially inserted in the first cavity 314. In such examples, each of the spring member(s) 310, 510, 540, 542, 544, 546 of the damper assembly 300 is substantially straight and/or extends along a substantially linear path (e.g., see FIG. 14).

The example method 1600 of FIG. 16 also includes bending the spring member(s) (block 1604). In some examples, one or more (e.g., all) of the first spring member 310, the second spring member 510, the third spring member 540, the fourth spring member 542, the fifth spring member 544, and/or the sixth spring member 546 of the damper assembly 300 is/are bent (e.g., elastically) (e.g., see FIG. 15), for example, via user manipulation and/or a tool or device configured to bend such spring member(s). During such bending, each of the spring member(s) 310, 510, 540, 542, 544, 546 has and/or begins forming respective bend radii.

The example method 1600 of FIG. 16 also includes guiding, via the intermediate plate, inner and outer radial portions of the respective spring member(s) (block 1606). In some examples, the first body 316 of the intermediate portion 312 is configured to guide inner and outer radial portions of the respective spring member(s) 310, 510, 540, 542, 544, 546. For example, with respect to the seventh spring member 1100, the intermediate portion 312 is configured to guide the inner and outer radial portions 1101, 1102 of the seventh spring member 1100 whereby (a) the opposite ends 1402, 1404 of the seventh spring member 1100 engage the fourth guide surface 1104 of the intermediate portion 312 and (b) the area 1514 of the seventh spring member 1100 engages the third guide surface 1103 of the intermediate portion 312.

The example method 1600 of FIG. 16 also includes maintaining, via the intermediate plate, bend radii of the respective spring member(s) (block 1608). In some examples, the first body 316 of the intermediate portion 312 engages (e.g., slidably engages) some or all of the inner and outer radial portions of the respective spring member(s) 310, 510, 540, 542, 544, 546 to maintain the bend radii of the respective spring member(s) 310, 510, 540, 542, 544, 546.

Although the example method of FIG. 16 is described in connection with the flowchart of FIG. 16, other methods of implementing the damper assembly 300 may alternatively be used. For example, the order of execution of the block 1602, 1604, 1606, 1608 may be changed, and/or some of the blocks 1602, 1604, 1606, 1608 described may be changed, eliminated, or combined. In some examples, the example operations of blocks 1602, 1604, 1606, 1608, 1610 may be performed for each of the spring member(s) 310, 510, 540, 542, 544, 546 of the damper assembly 300 such that the spring members 310, 510, 540, 542, 544, 546 are successively installed on the damper assembly 300.

Figure 17:
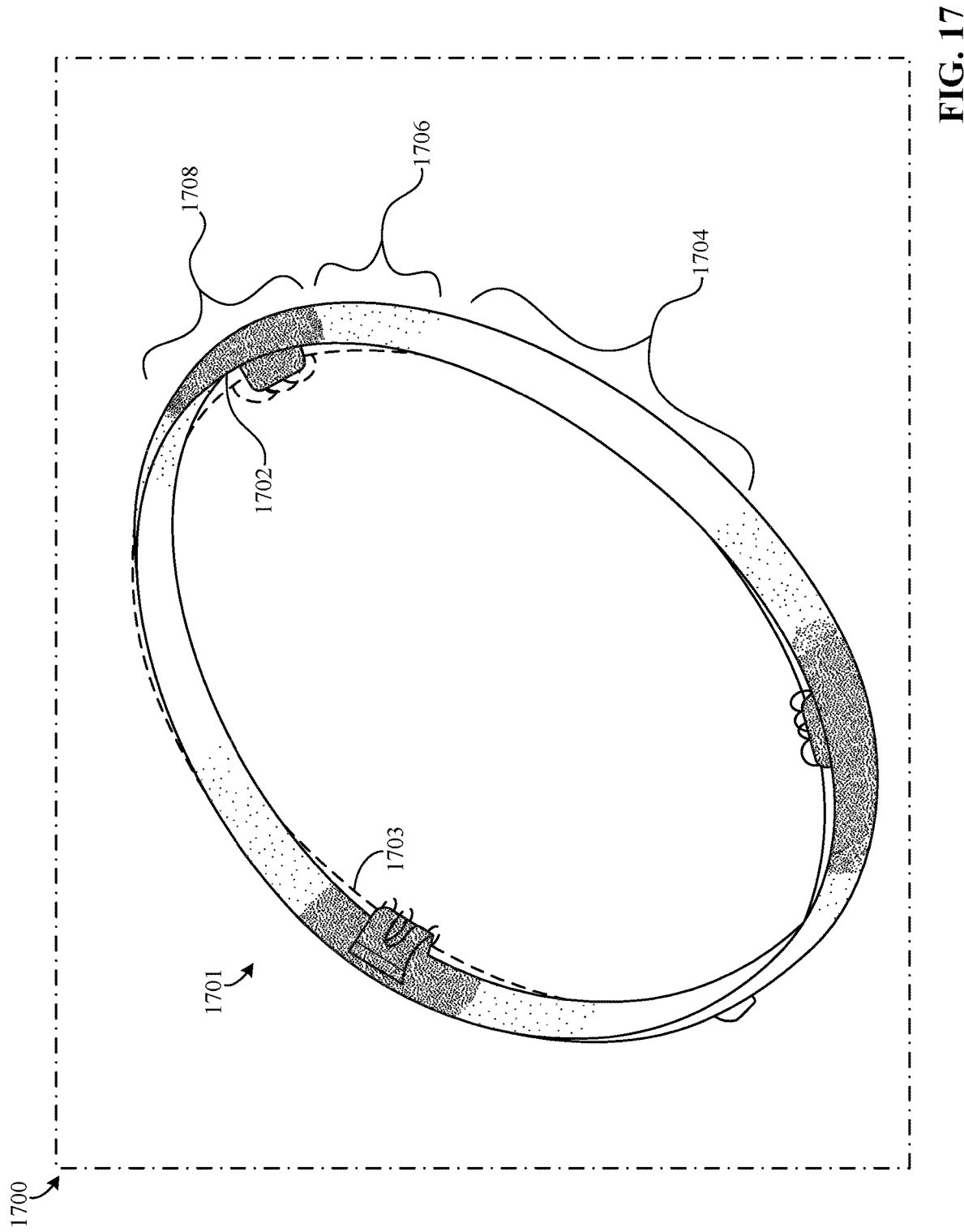
FIG. 17 is a strain map showing deformation associated with a secondary intermediate portion of a torque converter damper resulting from operation of the torque converter damper.

FIG. 17 is a first strain map 1700 showing deformation associated with a secondary intermediate portion (e.g., an intermediate plate) 1701 of a torque converter damper resulting from operation of the torque converter damper. According to the illustrated example of FIG. 17, the secondary intermediate portion 1701 has a thickness and a diameter that is substantially the same relative to a thickness and a diameter of the intermediate portion 312 of FIGS. 3-13. Unlike the intermediate portion 312 of FIGS. 3-13, a fourth body 1702 of the secondary intermediate portion 1701 does not include a cross-sectional area that is U-shaped or C-shaped. When the secondary intermediate portion 1701 rotates at a substantially high angular velocity (e.g., resulting from engine operation), rotational forces and/or a centrifugal load associated with spring member(s) of the torque converter damper cause the secondary intermediate portion 1701 to substantially vibrate, oscillate, and/or deform. An un-deformed state 1703 of the secondary intermediate portion 1701, provided when the secondary intermediate portion 1701 is not rotating, is represented by the dotted/dashed line of FIG. 17, for clarity in the deformation associated with the secondary intermediate portion 1701.

The secondary intermediate portion 1701 of FIG. 17 has low strain areas 1704, medium strain areas 1706 (as represented by the low density shading of FIG. 17), and high strain areas 1708 (as represented by the high density shading of FIG. 17) associated therewith due to the rotational forces acting on the secondary intermediate portion 1701. The high strain areas 1708 associated with the secondary intermediate portion 1701 correspond to substantially large areas of the body 1702 of the secondary intermediate portion 1701. In particular, a value corresponding to a maximum radial deformation of the secondary intermediate portion 1701 is substantially 1.89 millimeters (mm) or more. More particularly, the maximum radial deformation of the secondary intermediate portion 1701 occurs on the body 1702 of the secondary intermediate portion 1701.

Figure 18:
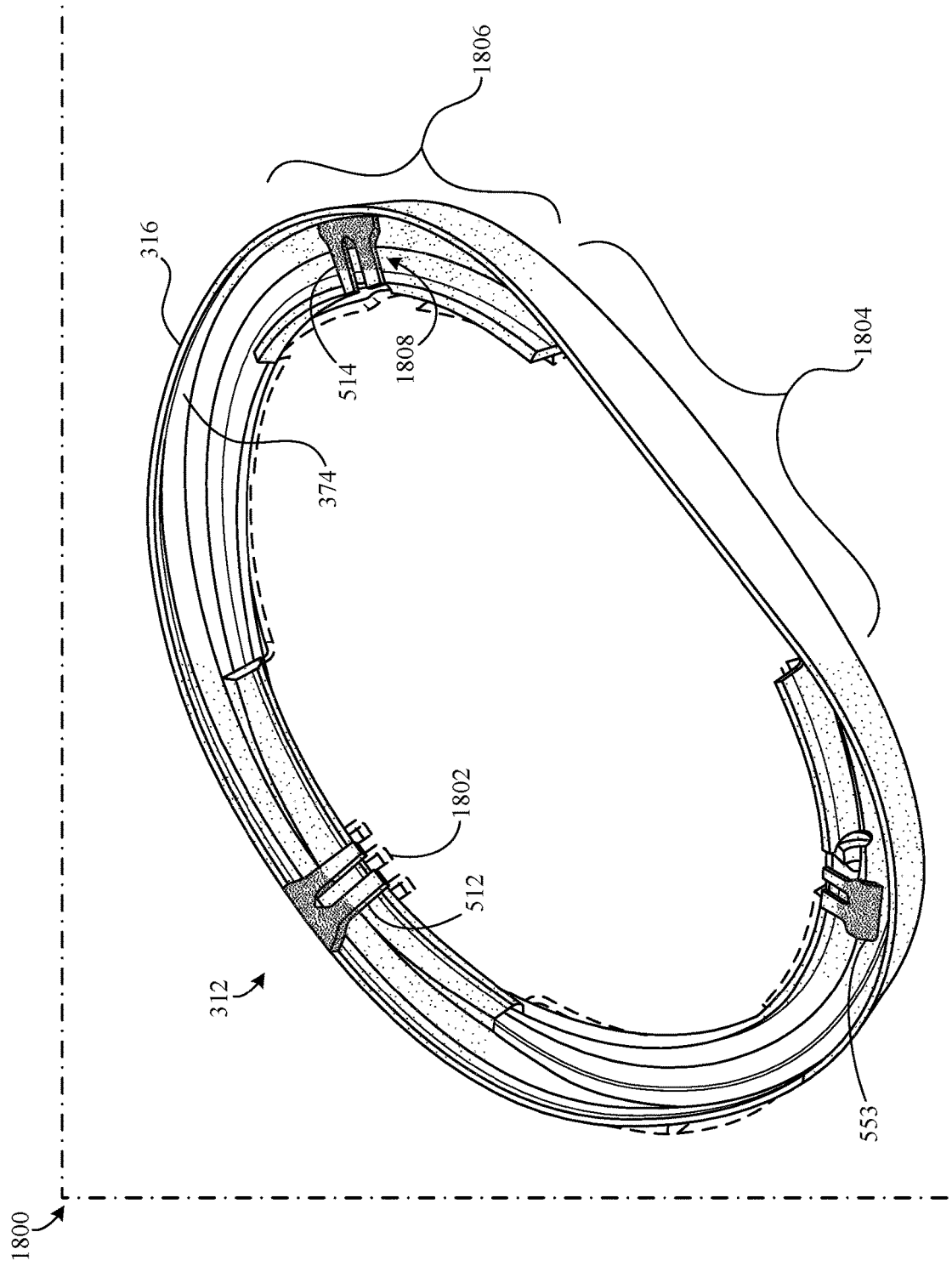
FIG. 18 is a different strain map showing deformation associated with an example intermediate portion in accordance with the teachings of this disclosure.

FIG. 18 is a second strain map 1800 showing deformation associated with the example intermediate portion 312 of FIGS. 3-13. According to the illustrated example of FIG. 18, when the intermediate portion 312 rotates at a substantially high angular velocity (e.g., resulting from operation of the engine 102), rotational forces and/or a centrifugal load associated with the spring member(s) 310, 510, 540, 542, 544, 546 cause the intermediate portion 312 to slightly vibrate, oscillate, and/or deform. An un-deformed state 1802 of the intermediate portion 312, provided when the intermediate portion 312 is not rotating, is represented by the dotted/dashed lines of FIG. 18, for clarity in the deformation associated with the intermediate portion 312. The intermediate portion 312 of FIG. 18 has low strain areas 1804, medium strain areas 1806 (as represented by the low density shading of FIG. 18), and high strain areas 1808 (as represented by the high density shading of FIG. 18) associated therewith. The high strain areas 1808 associated with the intermediate portion 312 correspond to only the tabs 512, 512, 553 of the intermediate portion 312. Unlike the illustrated example of FIG. 17, no portion of the first body 316 of FIG. 18 corresponds to the high strain areas 1808. Thus, the intermediate portion 312 of FIG. 18 exhibits substantially less radial deformation during rotation compared to the secondary intermediate portion 1701 of FIG. 17, for example, due to the first cross-sectional area 375 and/or the first, second, and third portions 370, 372, 374 of the first body 316 providing the first cross-sectional area 375. In some examples, during operation of the vehicle torque converter 200 when the clutch 302 is the second state, a value corresponding to a maximum radial deformation of the intermediate portion 312 is substantially 0.75 mm or less. In such examples, the maximum radial deformation of the intermediate portion 312 occurs on the first body 316 or the third portion 374 thereof.

As used herein, the terms "Including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

It will be appreciated that the systems, apparatus, and methods disclosed in the foregoing description provide numerous advantages. Examples disclosed herein provide an example damper assembly for a vehicle torque converter including an intermediate portion that is particularly configured to reduce and/or mitigate associated radial deformation when the intermediate portion is under a load. Disclosed examples facilitate installing one or more spring members on the damper assembly via the intermediate portion, which substantially reduces production time and/or costs associated with producing a torsional vibration damper. Further, some disclosed examples decrease a packaging size typically associated with torque converter dampers.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A vehicle torque converter, comprising:
a clutch; and
a torsional vibration damper configured to receive a torque from the clutch when the clutch is engaged and dampen a torsional vibration in the torque, the torsional vibration damper including:
a driven plate;
a retainer plate rotatable relative to the driven plate;
a first spring member operatively coupled to the driven plate and the retainer plate;
a second spring member operatively coupled to the driven plate and the retainer plate, rotation of the retainer plate relative to the driven plate compressing and decompressing the first and second spring members; and
an intermediate plate positioned radially outward relative to the driven plate and the retainer plate, the intermediate plate including a body that defines an annular cavity though which the first and second spring members extend, the body configured to engage inner and outer radial portions of the respective first and second spring members to maintain bend radii of the respective first and second spring members, wherein:
the driven plate includes an output tab operatively coupled between the first and second spring members,
the retainer plate includes an input tab operatively coupled between the first and second spring members,
the intermediate plate includes a cutout positioned on the body and at least partially exposing the inner and outer radial portions of the respective first and second spring members, the output tab of the driven plate and the input tab of the retainer plate extending through the cutout, and
each of the output tab and the input tab is centrally positioned in the cutout and configured to travel across at least a partial length of the cutout based on relative rotation associated with the driven plate, the retainer plate, and the intermediate plate.

2. The vehicle torque converter of claim 1, wherein the body of the intermediate plate includes a first cross-sectional area that is U-shaped or C-shaped.

3. The vehicle torque converter of claim 2, wherein each of the driven plate and the retainer plate includes a tab engaged with the first and second spring members and extending at least partially into an open side of the first cross-sectional area.

4. The vehicle torque converter of claim 2, wherein the body of the intermediate plate includes a second cross-sectional area, different from the first cross-sectional area, that is L-shaped.

5. The vehicle torque converter of claim 1, wherein:
the intermediate plate includes a first transfer tab engaged with the first spring member and a second transfer tab engaged with the second spring member, and
the input tab is movable relative to the output tab, the first transfer tab, and the second transfer tab.

6. The vehicle torque converter of claim 1, wherein more than half of an uncompressed length of the first or second spring member is radially guided by an inner radial portion of the body.

7. The vehicle torque converter of claim 1, wherein the input tab and a piston of the clutch are configured to axially guide the intermediate plate.

8. The vehicle torque converter of claim 1, wherein a portion of the retainer plate is configured to radially guide the intermediate plate.

9. The vehicle torque converter of claim 1, wherein the body of the intermediate plate includes an inner radial portion, a central portion, and an outer radial portion that are connected together, the inner radial portion of the body engaging central areas of the respective first and second spring members, the outer radial portion of the body engaging ends of the respective first and second spring members.

10. The vehicle torque converter of claim 9, wherein the inner and outer radial portions of the body of are concentric and spaced from each other by a radial distance.

11. A damper assembly of a vehicle torque converter, comprising:
a first spring member;
a second spring member;
an output portion coupled to a turbine and including an output tab configured to engage the first and second spring members;
an input portion coupled to a piston of a clutch and including an input tab configured to engage the first and second spring members, the input portion rotatable relative to the output portion; and
an intermediate portion rotatable relative to the output portion and the input portion, a body of the intermediate portion including an inner radial portion, a central portion, and an outer radial portion that, together, form a spring cavity in which the first and second spring members are positioned, the inner radial portion and the outer radial portion of the body configured to radially guide the first and second spring members, wherein:
the intermediate portion includes a cutout positioned on the body and at least partially exposing the inner and outer radial portions of the respective first and second spring members, the output tab and the input tab extending through the cutout, and
each of the output tab and the input tab is centrally positioned in the cutout and configured to travel across at least a partial length of the cutout based on relative rotation associated with the input portion, the output portion, and the intermediate portion.

12. The damper assembly of claim 11, wherein the inner radial portion, the central portion, and the outer radial portion define a first cross-sectional area of the body that is U-shaped or C-shaped.

13. The damper assembly of claim 12, wherein the central portion and the outer radial portion define a second cross-sectional area of the body, different relative to the first cross-sectional area of the body, that is L-shaped.

14. The damper assembly of claim 13, wherein the inner radial portion of the body is discontinuous and includes a first segment and a second segment that extend at least partially around an axis associated with the damper assembly, the first segment configured to provide inner radial guidance to the first spring member, the second segment configured to provide inner radial guidance to the second spring member.

15. The damper assembly of claim 13, wherein the intermediate portion includes a primary sector corresponding to the first cross-sectional area and a secondary sector, adjacent the primary sector, corresponding to the second cross-sectional area, the first cross-sectional area substantially uniform across a length of the primary sector, the second cross-sectional area substantially uniform across a length of the secondary sector.

16. The damper assembly of claim 11, wherein the intermediate portion is slidably interposed between the input portion and the piston.

\* \* \* \* \*